United States Patent
Koike

(10) Patent No.: US 9,348,072 B2
(45) Date of Patent: May 24, 2016

(54) OPTICAL FILTER DEVICE AND ELECTRONIC APPARATUS

(71) Applicant: Seiko Epson Corporation, Tokyo (JP)

(72) Inventor: Shigemitsu Koike, Suwa (JP)

(73) Assignee: Seiko Epson Corporation (JP)

(*) Notice: Subject to any disclaimer, the term of this patent is extended or adjusted under 35 U.S.C. 154(b) by 82 days.

(21) Appl. No.: 14/133,816

(22) Filed: Dec. 19, 2013

(65) Prior Publication Data

US 2014/0177058 A1 Jun. 26, 2014

(30) Foreign Application Priority Data

Dec. 20, 2012 (JP) ................................ 2012-277756

(51) Int. Cl.
*G02B 5/28* (2006.01)
*G02B 7/00* (2006.01)
*G02B 5/00* (2006.01)

(52) U.S. Cl.
CPC . *G02B 5/284* (2013.01); *G02B 5/00* (2013.01); *G02B 5/28* (2013.01); *G02B 7/006* (2013.01)

(58) Field of Classification Search
CPC ............ G02B 5/00; G02B 5/28; G02B 5/284; G02B 7/006
USPC .................. 359/370, 577, 578, 584
See application file for complete search history.

(56) References Cited

U.S. PATENT DOCUMENTS

| | | | |
|---|---|---|---|
| 6,985,281 B2 | 1/2006 | Wagner et al. | |
| 7,002,697 B2 | 2/2006 | Domash et al. | |
| 7,514,685 B2 | 4/2009 | Yoshida | |
| 7,923,904 B2 | 4/2011 | Takeuchi et al. | |
| 2003/0072009 A1 | 4/2003 | Domash et al. | |
| 2003/0151818 A1 | 8/2003 | Wagner et al. | |
| 2008/0062426 A1 | 3/2008 | Yoshida | |
| 2010/0295421 A1 | 11/2010 | Takeuchi et al. | |
| 2011/0261460 A1* | 10/2011 | Yamazaki et al. | ............ 359/578 |

FOREIGN PATENT DOCUMENTS

| | | |
|---|---|---|
| JP | 10-284975 | 10/1998 |
| JP | 2005-510756 A | 4/2005 |
| JP | 2008-070163 A | 3/2008 |
| JP | 2009-194091 A | 8/2009 |
| WO | WO-2003-046630 A1 | 6/2003 |

* cited by examiner

*Primary Examiner* — Bumsuk Won
*Assistant Examiner* — William R Alexander
(74) *Attorney, Agent, or Firm* — Harness, Dickey & Pierce, P.L.C.

(57) ABSTRACT

An interference filter is fixed with respect to a base substrate by a fixing member which is disposed on one portion which is on the outer side of a filter region. Accordingly, since the periphery end of the interference filter, other than a portion (end portion) in which the fixing member is disposed, becomes a floated state (free end), it is possible to suppress the warping of the interference filter even when there is the difference in coefficients of thermal expansion with the base substrate. Further, spacer portions which are lower than the height of the fixing member are formed outside the filter region and on the portion separated from the fixing member. At the time of the impact, since the spacer portions come in contact with the base substrate to function as stoppers, it is possible to suppress occurrence of peeling-off or cracks on the fixing member.

11 Claims, 15 Drawing Sheets

OPTICAL FILTER DEVICE AND ELECTRONIC APPARATUS

BACKGROUND

1. Technical Field

The present invention relates to an optical filter device, and an electronic apparatus including the optical filter device.

2. Related Art

In the related art, an interference filter has been known in which reflection films which are provided to oppose each other with a predetermined gap in between, on surfaces of a pair of substrates which oppose each other. In addition, an optical filter device has been known in which such an interference filter is accommodated in a housing (for example, see JP-A-2008-70163 and JP-T-2005-510756).

An infrared type gas detector (optical filter device) disclosed in JP-A-2008-70163 includes a package (housing) which has a plate-shaped table (base substrate) and a cylindrical cap. In the housing, a periphery portion of the base substrate and a cylindrical end portion of the cap are welded or bonded to be connected to each other, and a space for accommodating a Fabry-Perot filter (interference filter) is provided between the base substrate and the cap. In this optical filter device, the interference filter is bonded to be fixed to a detection unit, and the detection unit is bonded to be fixed to an upper portion of a table of a can package.

JP-T-2005-510756 discloses an optical filter device (optical electronic device) in which a tunable optical filter (interference filter) is fixed to and accommodated in an inner portion of a package (housing). In this optical filter device, the interference filter is disposed in a vertical stack which is mounted on an upper surface of a header (base substrate) of the housing.

JP-A-2008-70163 and JP-T-2005-510756 disclose description of accommodation and fixation of the interference filter in the inner portion of the housing, however, do not disclose a specific method.

For example, in a case where the interference filter is fixed to the entire surface of the base substrate which is a fixing target, there was a concern that a reflection film is warped due to an effect from a difference in both coefficients of thermal expansion, based on temperature change. In addition, in a case of fixing the interference filter with an adhesive, there was a concern that the reflection film is warped due to an effect from contraction at the time when an adhesive is hardened, and there was a problem of degradation of optical properties.

SUMMARY

An advantage of some aspects of the invention is to solve at least a part of the problems described above, and the invention can be implemented as the following forms or application examples.

Application Example

An application example is directed to an optical filter device including: an interference filter which includes a first substrate, a second substrate which opposes the first substrate, a first reflection film which is provided on the first substrate, and a second reflection film which is provided on the second substrate and opposes the first reflection film with a predetermined gap interposed therebetween; and a housing which includes a base substrate for loading the interference filter and accommodates the interference filter, in which the interference filter is fixed with respect to the base substrate by a fixing member which is disposed on one portion of the outside, in a plan view, of a filter region including the first reflection film and the second reflection film, and spacer portions which are lower than the height of the fixing member are formed outside the filter region and on portions separated from the fixing member.

According to the configuration, the interference filter is fixed with respect to the base substrate by the fixing member disposed on one portion of the outside of the filter region. Accordingly, since a periphery end which is other than a portion (end portion) in which the fixing member is disposed becomes a floated state (free end), it is possible to suppress warping of the interference filter (reflection film) even when there is a difference in coefficients of thermal expansion with the base substrate. In detail, in a case where the fixing member is disposed over the entire surface between the second substrate and the base substrate, since there is no way to avoid expansion and contraction stress due to the difference in both coefficients of thermal expansion of the second substrate and the base substrate, the warping of the interference filter itself occurs. In addition, in a case where an adhesive is used as the fixing member, stress due to contraction at the time of hardening is operated over the entire second substrate, and thus the warping occurs. With respect to this, with the configuration in which the fixing member is disposed on one portion (one side) of the interference filter outside the filter region, since the other three sides are in a floated state (free end), even when there is a difference in coefficients of thermal expansion with the base substrate, it is possible to release the expansion and contraction stress due to this difference on the free end side. In addition, even when the adhesive is used, the effect from the expansion and contraction stress is limited to one portion on which the fixing member is formed, and the other regions are not affected.

Accordingly, it is possible to suppress warping of the interference filter. Therefore, even when temperature change or expansion and contraction due to the adhesive occur, it is possible to secure desired optical properties.

Thus, it is possible to provide an optical filter device having stable optical properties.

Further, the spacer portions which are lower than the height of the fixing member are formed outside the filter region and on the portion separated from the fixing member. As described above, since the end portion (free end) other than the one end of the interference filter which is fixed by the fixing member is in a floated state, when applying impact to the housing, the interference filter moves in height direction inside the housing, with the fixing member as a supporting point. When the movement thereof is rapid, there is a concern that fixing (bonding) strength of the fixing member is exceeded and peeling-off or cracks on the fixing member occur, however, according to the configuration of the application example, at the time of the impact, first, the spacer portions come in contact with the base substrate to function as stoppers. Accordingly, even in a case where the impact is applied, it is possible to suppress occurrence of peeling-off or cracks on the fixing member.

Therefore, it is possible to provide an optical filter device having sufficient impact resistance.

It is preferable that the spacer portions are protrusions formed on the surface of the second substrate facing the base substrate.

It is preferable that the interference filter is formed in a rectangular shape in a plan view, one side of the second substrate forms an extended region which is extended from the first substrate, and the fixing member is provided between the extended region and the base substrate.

It is preferable that the spacer portions are formed between the filter region and the extended region, in a plan view, and/or on two apexes on the opposing side of the side on which the extended region is formed.

It is preferable that a first terminal for electric connection is formed on the surface of the extended region facing the first substrate, and the first terminal and a second terminal which is formed on the base substrate are connected to each other by wire bonding.

It is preferable that a plurality of the first terminals are formed, and the fixing member is disposed so as to be superimposed on the plurality of first terminals.

It is preferable that the housing further includes a lid having a recessed shape, the lid is joined with the base substrate in a state where a recessed shape thereof is put face down, and the spacer portions are also formed between the interference filter and a bottom surface of the recess shape of the lid.

It is preferable that the spacer portions are protrusions which are formed on the base substrate or the bottom surface of the recessed shape of the lid.

It is preferable that the fixing member is in a region in which a plurality of sub fixing portions are formed to be aggregated.

An electronic apparatus includes the optical filter device described above.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiment 1

Hereinafter, an optical filter device according to Embodiment 1 will be described with reference to the drawings.

1. Outline of Optical Filter Device

Figure 1:
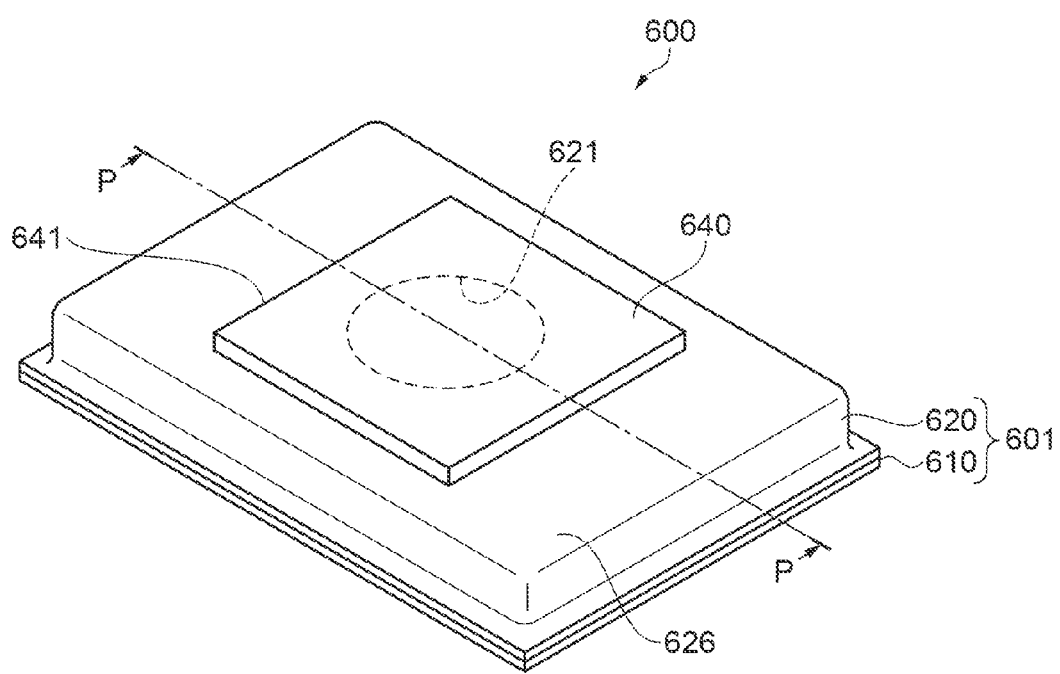
FIG. 1 is a perspective view of an optical filter device according to Embodiment 1.
Figure 2:
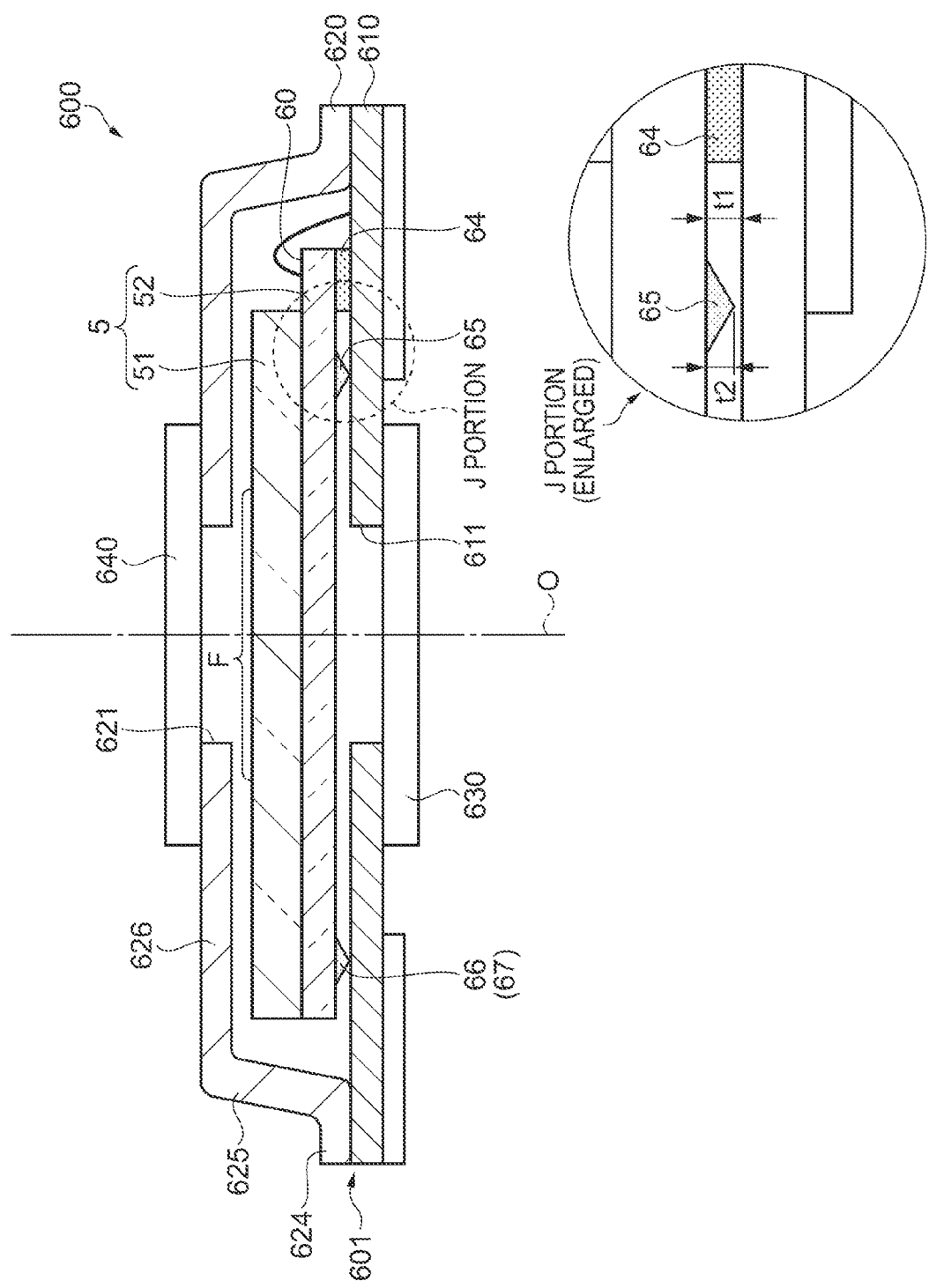
FIG. 2 is a side cross-sectional view of an optical filter device.

FIG. 1 is a perspective view of a schematic configuration of the optical filter device according to Embodiment 1. FIG. 2 is a side cross-sectional view of a cross section taken along line P-P of FIG. 1.

An optical filter device 600 is an optical filter using an interference operation of light, and is a optical device which extracts and emits light having a predetermined target wavelength, from incident investigation target light. The optical filter device 600 is configured with a housing 601, an interference filter 5 (see FIG. 2) which is accommodated in the housing, and the like.

Such an optical filter device 600 is embedded in an optical module such as a colorimetric sensor, or an electronic apparatus such as a colorimetry apparatus or a gas analysis apparatus, for example. A configuration of an optical module or an electronic apparatus including the optical filter device 600 will be described later.

As shown in FIG. 1, the housing 601 has a configuration in which a lid 620 is covered with respect to a base substrate 610 which has an approximately rectangular shape, in a plan view. The lid 620 has a rectangular tray shape, and a periphery portion thereof is joined with the base substrate 610, in a state where a recessed shape of the tray shape is laid down, in a cross sectional view as shown in FIG. 2. The interference filter 5 which is loaded (mounted) on the base substrate 610 is accommodated in the recessed shape of the lid 620.

An opening portion 621 which is a hole for taking in light from outside is formed on a recessed bottom portion (top portion) of the lid 620. The opening portion 621 is hermetically sealed from the outer side (surface side) with a glass substrate 640. In the following description, a point of sight which faces the glass substrate 640 from the surface side is called a plan view.

In a plan view, an opening portion 611 (hole) for emitting light which is transmitted through the interference filter 5 is also formed on the base substrate 610 so as to be superimposed on the opening portion 621 of the lid 620. The opening portion 611 is hermetically sealed from the outer side (rear surface side) with a glass substrate 630.

With this configuration, light which entered from the glass substrate 640 on the surface enters the interference filter 5, becomes light having a target wavelength selected according to a gap between mirrors of a pair of dielectric multilayer films which are disposed to oppose each other, and exists from the glass substrate 630 on the rear surface.

As described above, securing of stable optical properties or securing of sufficient impact resistance is required to the optical filter device 600.

Herein, as shown in FIG. 2, in the optical filter device 600 of the embodiment, both optical properties and impact resistance are realized, by employing a configuration of, in addition to fixing the interference filter 5 with a fixing member 64 which is disposed on a portion, providing spacer portions 65 and 66 (67) which are disposed lower than a height of the fixing member. Hereinafter, the specific configuration will be described in detail.

2. Configuration of Interference Filter

Figure 3:
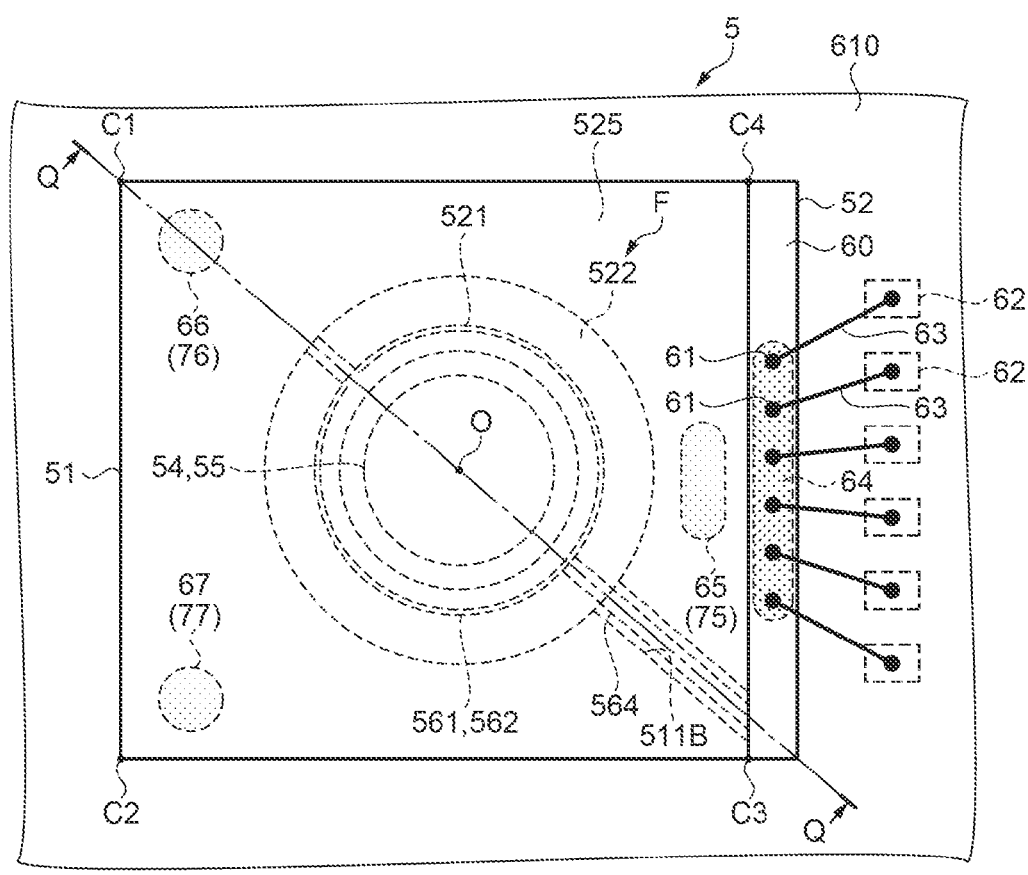
FIG. 3 is a plan view of an interference filter.
Figure 4:
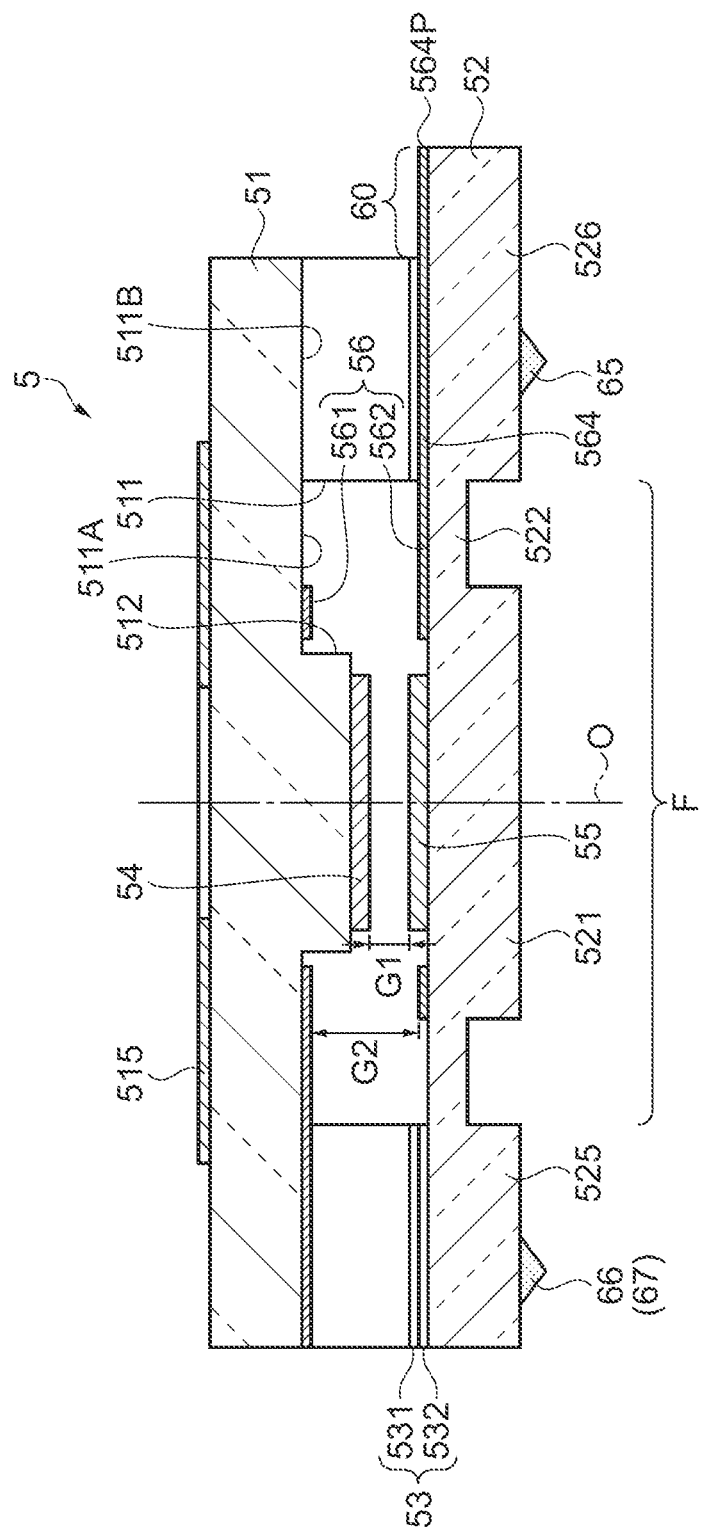
FIG. 4 is a side cross-sectional view of a cross section taken along line Q-Q of an interference filter.

FIG. 3 is a plan view of a schematic configuration of the interference filter. FIG. 4 is a side cross-sectional view of a cross section taken along line Q-Q of FIG. 3.

First, the schematic configuration of the interference filter 5 will be described with reference to FIGS. 3 and 4.

As shown in FIG. 3, the interference filter 5 is an optical member which has an approximately rectangular shape, and has a configuration in which a fixed substrate 51 as a first substrate and a movable substrate 52 as a second substrate are superimposed on each other. One side (right side) of short sides of the rectangle, is an extended region 60 which is obtained by protrusion of one side of the movable substrate 52 from the fixed substrate 51. In detail, as shown in FIG. 4, a portion in which one side of the movable substrate 52 is protruded from the outer shape of the fixed substrate 51, in a plan view, is the extended region 60. As shown in FIG. 3, a plurality of connection terminals 61 as first terminals for driving the interference filter 5 are formed in the extended region 60, and the connection terminals 61 are electrically connected to corresponding terminals 62 as second terminals on the base substrate 610, with bonding wires 63, respectively.

When facing the drawing, long sides of the interference filter 5 of FIG. 3 are up and down two sides, and extending direction of the long sides is coincided with extending direction of a cross-sectional line P-P of FIG. 1.

Borosilicate glass is used for the materials of the fixed substrate 51 and the movable substrate 52, as a preferred example. Any materials may be used as long as it is a glass member having transparency without limitation of this material, and various glasses such as soda glass, crystalline glass, quartz glass, lead glass, potassium glass, or alkali-free glass, or a crystal may be used.

As shown in FIG. 4, the fixed substrate 51 and the movable substrate 52 are integrated (bonded) using a joining film 53 (first joining film 531 and second joining film 532) which is configured by a plasma-polymerized film or the like having siloxane as a main component, as an adhesive. The joining film 53 is formed on a periphery portion, in a plan view, of a portion in which the fixed substrate 51 and the movable substrate 52 are superimposed on each other.

A fixed reflection film 54 as a first reflection film is provided on the fixed substrate 51. A movable reflection film 55 as a second reflection film is provided on the movable substrate 52. The fixed reflection film 54 and the movable reflection film 55 are disposed to oppose (face) each other with a gap G1 as a predetermined gap interposed therebetween.

An electrostatic actuator 56 for adjusting a distance (dimension) of the gap G1 is provided on the interference filter 5. The electrostatic actuator 56 is configured with a fixed electrode 561 which is provided on the fixed substrate 51, and a movable electrode 562 which is provided on the movable substrate 52. The fixed electrode 561 and the movable electrode 562 oppose each other with an inter-electrode gap G2 (G2>G1) interposed therebetween. Herein, the electrodes 561 and 562 may have a configuration of being directly provided on substrate surfaces of the fixed substrate 51 and the movable substrate 52, respectively, or may have a configuration of being provided through the other film member. In addition, in the embodiment, the configuration in which the inter-reflection film gap G1 is smaller than inter-electrode gap G2 is used as an example, however the inter-reflection film gap G1 may be larger than the inter-electrode gap G2.

2-1. Configuration of Fixed Substrate

A substrate which is thicker than the movable substrate 52 is used for the fixed substrate 51, as a preferred example. The thickness thereof may be the same as that of the movable substrate 52, however, it is preferably thicker than the thickness of the movable substrate for securing rigidity to prevent bending, when driving the electrostatic actuator 56. An electrode disposition groove 511, a reflection film installing portion 512, and a wire lead-out groove 511B are formed on the fixed substrate 51 by performing etching process.

In a plan view, the electrode disposition groove 511 is formed in a circular shape around a plan center point O of the interference filter 5. As shown in FIG. 4, the reflection film installing portion 512 is protruded to the movable substrate 52 side from the electrode disposition groove 511. That is, the reflection film installing portion 512 is formed in a cylindrical shape to be protruded in an island shape from the electrode disposition groove 511.

Herein, a groove bottom surface of the electrode disposition groove 511 is an electrode installing surface 511A on which the fixed electrode 561 is disposed. In addition, a protruded tip end surface (cylinder top surface) of the reflection film installing portion 512 is a reflection film installing surface.

A circular fixed electrode 561 is provided on the electrode installing surface 511A. This fixed electrode 561 is provided in a region opposing the movable electrode 562 of a movable portion 521 which will be described later, among the electrode installing surface 511A. In addition, an insulating film for securing an insulating property between the fixed electrode 561 and the movable electrode 562 may be laminated on the fixed electrode 561. In the embodiment, the configuration in which one fixed electrode 561 is provided on the electrode installing surface 511A is used as an example, however, a configuration (double electrode configuration) in which two electrodes concentric around the plan center point O are provided may be used, for example.

As described above, the reflection film installing portion 512 is formed in an approximately cylindrical shape to have a smaller radial dimension than that of the electrode disposition groove 511 coaxially with the electrode disposition groove 511, and a top portion thereof is a reflection film installing surface. A fixed reflection film 54 is installed on this reflection film installing surface.

A dielectric multilayer film obtained by alternately laminating a high refractive layer and a low refractive layer to have a multilayer, is used as the fixed reflection film 54 in the preferred example. For example, $TiO_2$ film is used as the high refractive layer and $SiO_2$ film is used as the low refractive layer. Alternatively, a single-layered metal film such as Ag may be used, and a single-layered alloy film such as Ag alloy may be used. Further, a reflection film obtained by laminating the metal film (or alloy film) on the dielectric multilayer film, a reflection film obtained by laminating the dielectric multilayer film on the metal film (or alloy film), or a reflection film obtained by laminating a single-layered refractive layer ($TiO_2$ or $SiO_2$) and the metal film (or alloy film) may be used.

As shown in FIG. 3, the wire lead-out groove 511B is formed in linear towards an apex C3 of the fixed substrate 51 from a circular shape surrounding the fixed reflection film 54. A wire (not shown) for supplying a driving voltage to the fixed electrode 561 is formed on the wire lead-out groove 511B. The wire is electrically connected to the movable substrate 52 side, by a conductive member (not shown) such as a silver point disposed in the vicinity of the apex C3.

The embodiment will be described by returning to FIG. 4.

The surface (surface on the lid 620 side) of the fixed substrate 51 is a light incident surface. An antireflection film (not shown) is formed on the light incident film as a preferred example. The antireflection film has a configuration in which a low refractive index film and a high refractive index film are alternately laminated to each other. By providing the antireflection film, it is possible to decrease a reflectance of visible light on the light incident surface and to increase transmittance thereof.

In addition, an aperture 515 formed of a material having light reflectivity such as Cr is provided on the antireflection film. The aperture 515 is formed in an annular shape in a plan view, and circumference in the circle thereof is set to an effective diameter for light interference by the fixed reflection film 54 (movable reflection film 55). That is, the aperture 515 functions as an aperture for converging incident light which is incident to the housing 601.

The first joining film 531 is provided in a portion other than the portion where the electrode disposition groove 511, the reflection film installing portion 512, and the wire lead-out groove 511B are provided, among the rear surface (surface on the movable substrate 52 side) of the fixed substrate 51. Since the first joining film 531 is joined with the second joining film 532 which is provided on the movable substrate 52, the fixed substrate 51 and the movable substrate 52 are joined with each other.

2-2. Configuration of Movable Substrate

A substrate thinner than the fixed substrate 51 is used for the movable substrate 52 in the preferred example, however, the thickness thereof may be the same with each other. The movable substrate 52 includes the circular movable portion 521 around the plan center point O, a holding portion 522 which is formed of a thin portion in which a groove for dividing the movable portion 521 is formed, and a substrate outer periphery portion 525 outside the holding portion 522.

As shown in FIG. 4, by forming a circular groove (in a plan view) with respect to the rear surface (surface on the base substrate 610 side) of the movable substrate 52 having a constant thickness, the movable portion 521 in the center and the holding portion 522 on the outer side are formed to be divided. In the interference filter 5, a region within (surrounded by) the holding portion 522 in a plan view is also called a "filter region F". In addition, an antireflection film may be formed on the rear surface of the movable portion 521, in the same manner as the fixed substrate 51 side.

The movable reflection film 55 and the movable electrode 562 are provided on the surface (surface on the fixed substrate 51 side) of the movable portion 521.

The movable reflection film. 55 is provided to oppose the fixed reflection film 54 with the predetermined gap G1 interposed therebetween, in the center portion of the movable portion 521 in a plan view. The movable reflection film 55 is the same reflection film as the fixed reflection film 54 described above.

The movable electrode 562 opposes the fixed electrode 561 with the inter-electrode gap G2 interposed therebetween, and is formed in a circular shape, in the same manner as the fixed electrode 561.

In addition, a wire 564 which connects the movable electrode 562 and the connection terminal 61 corresponding to the extended region 60 is formed on the movable substrate 52.

As described above, the movable portion 521 including the movable reflection film 55 is supported by the thin holding portion 522 surrounding the vicinity thereof. Accordingly, the holding portion 522 functions as a diaphragm (vibrating plate), and can vertically displace the entire movable portion 521. In detail, the thin holding portion 522 is more easily bent than the movable portion 521, and accordingly, the entire movable portion 521 can be displaced to the fixed substrate 51 side by a slight electrostatic attractive force. Since the movable portion 521 is thicker and has higher rigidity than the holding portion 522, shape change thereof substantially does not occur, even in a case where the movable portion is pulled to the fixed substrate 51 side by the electrostatic attractive force. Accordingly, the bending of the movable reflection film 55 provided on the movable portion 521 does not occur, and it is possible to maintain the fixed reflection film 54 and the movable reflection film 55 in a substantially parallel state, at all times. Herein, the example of the holding portion 522 having a diaphragm shape is shown, however, it is not limited thereto. For example, beam-like holding portions which are disposed at intervals of equal angle may be provided around the plan center point O.

Herein, the spacer portions 65 and 66 (67) which are one of specific configurations of the embodiment are formed on the rear surface of the movable substrate 52.

As shown in FIG. 3, the spacer portion 65 is formed in a track shape (cocoon shape) between the extended region 60 and the holding portion 522, in a plan view. In detail, the spacer portion 65 is formed so that a longitudinal direction in a track shape is coincided with the extending direction of the extended region 60, and a length of the longitudinal direction is shorter than a diameter of the movable reflection film 55. In addition, a length (width) of the track shape in a transverse direction is substantially the same as the protrusion length (width) of the extended region 60.

The spacer portion 66 is formed to have a circular shape in the vicinity of an apex C1 of the movable substrate 52. The spacer portion 67 is formed to have a circular shape in the vicinity of an apex C2 of the movable substrate 52. The diameters of the spacer portions 66 and 67 are smaller than the diameter of the movable reflection film 55, and are the substantially same dimension of the width of the spacer portion 65.

The spacer portions 65, 66, and 67 are disposed in a position corresponding to three apexes of virtual triangle (not shown) surrounding the movable reflection film 55, respectively. In addition, a height of each of the spacer portions 65, 66, and 67 is commonly set, and the height thereof is set to be lower than the height (thickness) of the fixing member 64 which will be described later.

As shown in FIG. 4, the spacer portion 66 (67) has a conical shape in which an apex angle is an obtuse angle. The spacer portion 65 also has a conical shape in which an apex angle is an obtuse angle in a plan view, however has a ridge line with a depth. That is, a shape of a laid triangular prism is formed.

The spacer portions 65, 66, and 67 are protrusions formed by processing of the rear surface of the movable substrate 52, and are apart of the movable substrate 52. They are formed by a photolithography method, as the preferred example. The spacer portion 66 will be described as an example. First, a circular (circular plate) resist, in a plan view, is applied to the portion of the movable substrate 52 for forming the spacer portion. Then, by performing isotropic etching using fluorine solvent such as hydrofluoric acid with the resist as a mask, the conical spacer portion 66 is formed. Alternatively, after forming a stereoscopic conical resist using a gray mask, by performing anisotropic dry etching, the resist shape is transferred to the substrate, and the spacer portion 66 may be formed. Alternatively, the spacer portion 66 may be cut from the movable substrate 52 using cutting process.

3. Configuration of Housing

The embodiment will be described by returning to FIG. 2.

Next, a configuration of the housing 601 will be described.

The base substrate 610 is a rectangular substrate which includes the opening portion 611 which is formed of a round hole in the substantially center, in a plan view. A single-layered ceramic substrate is used for the base substrate 610 in the preferred example.

The interference filter 5 in a state where the opening portion 611 is covered and the movable substrate 52 is set lower, is loaded on the base substrate 610. At that time, the center of the filter region F of the interference filter 5 and the center of the opening portion 611 is coincided with each other.

The movable substrate 52 is fixed to one portion with respect to the base substrate 610. In detail, the movable substrate is fixed by the fixing member 64 which is disposed on one portion which is on the outer side of the filter region F, in a plan view.

As shown in FIG. 3, the fixing member 64 is formed in a position which is superimposed on the extended region 60. In detail, the fixing member 64 is formed in the extended region 60 so as to be superimposed on the region in which six connection terminals 61 are formed. That is, the fixing member is formed in a position where the region in which the plurality of connection terminals 61 are formed is supported (back-up) from the rear surface (back surface) of the extended region 60.

In addition, thermoset silver paste is used for the fixing member 64 in the preferred example. In detail, silver paste is applied on the base substrate 610 using a dispenser, and after loading the interference filter 5 thereon, the fixing member 64 is formed by heating and hardening. The material of the fixing member 64 is not limited to the silver paste, any materials may be used as long as it is an inorganic adhesive, and bonding may be performed using a low-melting-point glass, for example. In this case, after applying paste containing low-melting-point glass powder (frit), the interference filter 5 is loaded, and heating and hardening (baking) is performed.

The embodiment will be described by returning to FIG. 2.

Herein, a height (thickness) of the fixing member 64 is set to a height t1, as shown in an enlarged view of a region J portion surrounded by a circle of FIG. 2. The height t1 is set to be higher than a height t2 of the spacer portion 65. As a design central value, the fixing member 64 is formed so that three spacer portions 65, 66, and 67 are slightly floated, however, a part of the spacer portions may come in contact with the base substrate 610 due to manufacturing variation. Even with this configuration, since the spacer portions 65, 66, and 67 and the base substrate 610 are not fixed (bonded) to each other, a buffering function when impact is applied can be obtained.

The lid 620 includes a joining portion 624 which is joined with the periphery portion of the base substrate 610, a side wall portion 625 which is continued from a lid joining portion 624 and is raised in a direction separating from the base substrate 610, and a top surface portion 626 which is continued from the side wall portion 625 and covers the fixed substrate 51 side of the interference filter 5. An opening portion 621 formed of a round hole in the substantial center in a plan view, is formed on the top surface portion 626. The center of the opening portion 621 and the center of the filter region F of the interference filter 5 are coincided with each other.

Kovar is used for the material of the lid 620, as the preferred example. However, the material is not limited to the Kovar, and metal such as 42 alloy, aluminum, copper, duralumin, or the like, or alloy containing any of those may be used.

In the lid 620, the joining portion 624 is fixed with respect to the periphery portion of the base substrate 610 by laser welding as the preferred example. It is not limited to the laser welding, and a joining method such as soldering using silver solder or the like or sealing using a eutectic alloy layer may be used.

As described above, the opening portion 621 of the top surface portion 626 is hermetically sealed with the glass substrate 640 from the surface side (outer side). The glass substrate 640 has a substantially rectangular shape (see FIG. 1) having a size to cover the opening portion 621 in a plan view. The borosilicate glass is used as the material of the glass substrate 640 in the preferred example. The material is not limited thereto, and a soda glass substrate, a crystalline substrate, a quartz substrate, a germanium substrate, or the like may be used. The glass substrate 640 is joined with respect to the lid 620 using low-melting-point glass.

In the same manner as described above, the opening portion 611 of the base substrate 610 is also hermetically sealed by the glass substrate 630 from outside (rear surface side). The size or the material of the glass substrate 630, or the adhesive with respect to the base substrate 610 is the same as the glass substrate 640.

3-1. Dimensional relationship of Preferred Example

Herein, a dimensional relationship of each portion of the preferred example will be described.

First, a planar size of the interference filter 5 in long side direction is approximately 11 mm, and the size thereof in short side direction is approximately 9 mm so that the interference filter 5 has a rectangular shape. A thickness of the fixed substrate 51 is approximately 1000 μm. A thickness of the movable substrate 52 is approximately 600 μm.

A planar size of the base substrate 610 is set to be greater than that of the interference filter 5. A thickness of the base substrate 610 is approximately 400 μm.

A planar size of the lid 620 is same as that of the base substrate 610. A thickness of the top surface portion 626 of the lid 620 is approximately 300 μm.

A mounting height of the interference filter 5 with respect to the base substrate 610 is approximately 30 μm. That is, the height t1 of the fixing member 64 is approximately 30 μm. In addition, a space between the interference filter 5 (fixed substrate 51) and the top surface portion 626 of the lid 620 is also approximately 30 μm.

The height t2 of each of the spacer portions 65, 66, and 67 is approximately 20 μm. The dimensions are not limited to these dimensions, and any dimensions may be used as long as they have the dimension relationships which satisfy the requirements described above, such that the height of the spacer portion is lower than that of the fixing member.

4. Manufacturing Method of Optical Filter Device

Herein, a manufacturing method of the optical filter device 600 will be described.

As a preparing step, a glass substrate 630 is joined with the base substrate 610 in a state of a single component of the base substrate 610. In the same manner, the glass substrate 640 is joined with the lid 620 in a state of a single component of the lid 620. In addition, the interference filter 5 is completed in the other step.

First, the interference filter 5 is mounted (loaded) on the base substrate 610. In detail, the silver paste is applied to the position of the upper portion of the base substrate 610 corresponding to the extended region 60, and the interference filter 5 is loaded, and then is mounted after hardening the fixing member 64 by heating. Ball bonding is performed between the connection terminal 61 as the first terminal of the extended region 60 and the terminal 62 as the second terminal on the base substrate 610 using a gold wire. A material of a bonding wire 63 may be aluminum or copper. Wedge bonding may be performed.

In the reduced pressure environment, the lid 620 is joined with the base substrate 610 on which the interference filter 5 is mounted. As the preferred example, they are joined by laser welding.

As described above, according to the optical filter device 600 of the embodiment, the following effects can be obtained.

In the optical filter device 600, the interference filter 5 is fixed with respect to the base substrate 610 by the fixing member 64 which is disposed on one portion outside the filter region F. Accordingly, since the periphery end of the interference filter 5 other than the portion (end portion) in which the fixing member 64 is disposed becomes a floated state (free end), it is possible to suppress warping of the interference filter 5 (filter region F) even when there is a difference in coefficients of thermal expansion with the base substrate 610. In detail, in a case where the fixing member is disposed over the entire surface between the interference filter 5 (movable substrate) and the base substrate 610, since there is no way to avoid of expansion and contraction stress due to the difference in both coefficients of thermal expansion, the warping of the interference filter 5 itself occurs. In addition, in a case where the adhesive is used as the fixing member, stress due to contraction at the time of hardening is operated over the entire movable substrate 52, and thus the warping occurs. With respect to this, with the configuration in which the fixing member 64 is disposed on one short side (extended region 60) of the rectangular interference filter 5, since the other three sides are in a floated state (free end), even when there is a difference in coefficients of thermal expansion with the base substrate 610, it is possible to release the expansion and contraction stress due to this difference on the free end side. In addition, even when the adhesive is used, the effect from the expansion and contraction stress is limited to one portion in which the fixing member 64 is formed, and the other regions are not affected. Accordingly, it is possible to suppress warping of the interference filter 5. Therefore, even when temperature change or expansion and contraction from the adhesive occur, it is possible to secure desired optical properties.

Thus, it is possible to provide the optical filter device 600 having stable optical properties.

Further, the spacer portions 65, 66, and 67 which are lower than the height of the fixing member 64 are formed outside of the filter region F and on the portion separated from the fixing member 64. As described above, since the end portion (free end) other than the one end of the interference filter 5 which is fixed by the fixing member 64 is in a floated state, when applying impact to the housing 601, the interference filter 5 moves in height direction inside the housing, with the fixing member 64 as a supporting point. When the movement thereof is rapid, there is a concern that fixing (bonding) strength of the fixing member 64 is exceeded and peeling-off or cracks on the fixing member 64 occur, however, according to the configuration of the embodiment, at the time of the impact, first, the spacer portions 65, 66, and 67 come in contact with the base substrate 610 to function as stoppers. Accordingly, even in a case where the impact is applied, it is possible to suppress occurrence of peeling-off or cracks on the fixing member 64. Particularly, as described in the dimension example of the preferred example, since the planar size of the interference filter 5 is great as approximately 10 mm square, an inertia moment when the impact is applied also becomes greater and overload is easily applied to the fixing member 64, however, by the stopper function, it is possible to suppress occurrence of peeling-off or cracks on the fixing member 64. Further, since the three spacer portions are disposed in the vicinity of the three apexes of the triangle surrounding the filter region F in a plan view, respectively, it is possible to support the interference filter 5 with a proper balance at the time of the impact.

Accordingly, it is possible to provide the optical filter device 600 having sufficient impact resistance.

In addition, the fixing member 64 is disposed so as to be superimposed on the plurality of connection terminals 61. In detail, the fixing member is formed in a position where the region in which the plurality of connection terminals 61 are formed is supported (back-up) from the rear surface (back surface) of the extended region 60. Accordingly, it is possible to improve manufacturing efficiency at the time of the wire bonding and the reliability. In detail, at the time of wire bonding between the plurality of connection terminals 61 and the terminal 62 on the base substrate 610, heat, ultrasound, pressure, or the like is applied with respect to the extended region 60, however, those can be reliably received by the fixing member 64 which is integrated with the base substrate 610. Further, the spacer portion 65 formed in an adjacent portion of the fixing member 64 also functions to support the supporting at the time of the wire bonding, with the fixing member 64.

In the preferred example, an inorganic material is used for the joining of each portion in the housing 601. In detail, the silver paste is used for the fixing member 64, the bonding wire 63 is used for the electric connection, and the low-melting-point glass is used for the front and rear glass substrates 630 and 640. The lid 620 is fixed by laser welding.

By using the joining with the inorganic materials, since gas emission (degas) inside the housing 601 can be reduced than a case of using an adhesive of an organic material, a sufficient degree of vacuum can be secured, and it is possible to secure the reliability of the interference filter 5.

Accordingly, it is possible to provide the optical filter device 600 having stable optical properties.

Embodiment 2

Hereinafter, an optical filter device according to Embodiment 2 will be described with reference to the drawings.

Outline of Optical Filter Device

Figure 5:
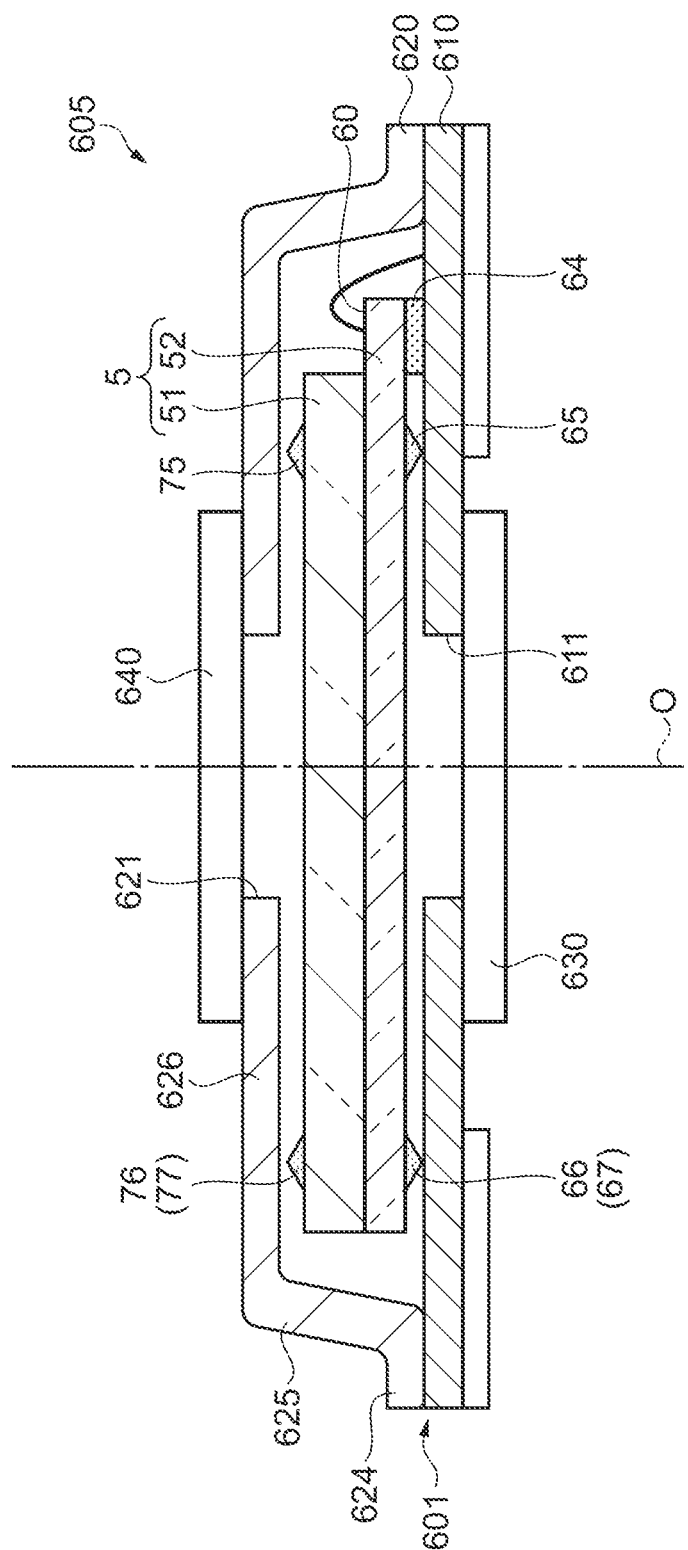
FIG. 5 is a side cross-sectional view of an optical filter device according to Embodiment 2.

FIG. 5 is a side cross-sectional view of the optical filter device according to Embodiment 2 and corresponds to FIG. 2. Herein, an outline of an optical filter device 605 according to the embodiment will be described mainly with reference to FIG. 5 and suitably with FIG. 3. In the description, the same configuration components as Embodiment 1 described above are denoted with the same reference numerals and the overlapped descriptions are omitted.

The optical filter device 605 of the embodiment is different from Embodiment 1 in which the spacer portion is formed also on the surface side of the interference filter 5. The other configurations are the same as the optical filter device 600 of Embodiment 1.

As shown in FIG. 5, in the interference filter 5 of the embodiment, spacer portions 75 and 76 (77) are formed also on the surface (fixed substrate 51 side), in addition to the spacer portions 65 and 66 (67) on the rear surface (movable substrate 52 side) described in Embodiment 1.

As shown in FIG. 3, positions and shapes of the spacer portions 75, 76, and 77 in a plan view are the same as the spacer portions 65, 66, and 67 on the rear surface. That is, the spacer portions 75, 76, and 77 on the front surface and the spacer portions 65, 66, and 67 on the rear surface are formed in the overlapped position in a plan view.

The embodiment will be described by returning to FIG. 5.

The spacer portions 75 and 76 (77) are protrusions which are formed by processing the surface of the fixed substrate 51, and are a part of the fixed substrate 51. The cross-sectional shape of the spacer portions 75 and 76 (77) is also the same as the spacer portions 65 and 66 (67) of the rear surface. In detail, the spacer portion 76 (77) has a conical shape in which an apex angle is an obtuse angle. The spacer portion 75 also has a conical shape in which an apex angle is an obtuse angle in a cross-sectional view, however has a ridge line with a depth. That is, a shape of a laid triangular prism is formed. The forming method of the spacer portions 75 and 76 (77) is also the same as the description in Embodiment 1. The fixing member is not provided on the surface of the fixed substrate 51 (interference filter 5).

A height of each of the spacer portions 75 and 76 (77) is set to be lower than the space between the interference filter 5 (fixed substrate 51) and the top surface portion 626 of the lid 620.

Dimensional Relationship of Preferred Example

Herein, a dimensional relationship of each portion of the preferred example will be described.

First, the dimensional relationship on the rear surface side of the interference filter 5 is the same as the description in Embodiment 1. In addition, the planar size and thickness of the base substrate 610, the lid 620, and the like are the same as the description in Embodiment 1.

The space between the interference filter 5 (fixed substrate 51) and the top surface portion 626 of the lid 620 is also set to approximately 30 μm which is the same as the description in Embodiment 1.

The height of each of the spacer portions 75 and 76 (77) is set to approximately 20 The dimensions are not limited to these, and any dimensions may be used as long as they have the dimensional relationships which satisfy the requirements described above.

As described above, according to the optical filter device 605 of the embodiment, the following effects can be obtained, in addition to the effects in Embodiment 1.

The interference filter 5 of the embodiment includes the spacer portions 75, 76, and 77 on the front surface (lid 620) side, in addition to the spacer portions 65, 66, and 67 on the rear surface (base substrate 610) side. Accordingly, even in a case where the impact is applied to the housing 601 and the interference filter 5 is moved in height direction inside the housing, with the fixing member 64 as a supporting point, the spacer portions 75, 76, and 77 on the front surface function as stoppers with respect to the lid 620 and the spacer portions 65, 66, and 67 on the rear surface function as stoppers with respect to the base substrate 610, respectively.

Accordingly, even when the impact is applied, it is possible to further reliably suppress occurrence of peeling-off or cracks on the fixing member 64.

Therefore, it is possible to provide the optical filter device 605 having sufficient impact resistance.

Electronic Apparatus 1

Figure 6:
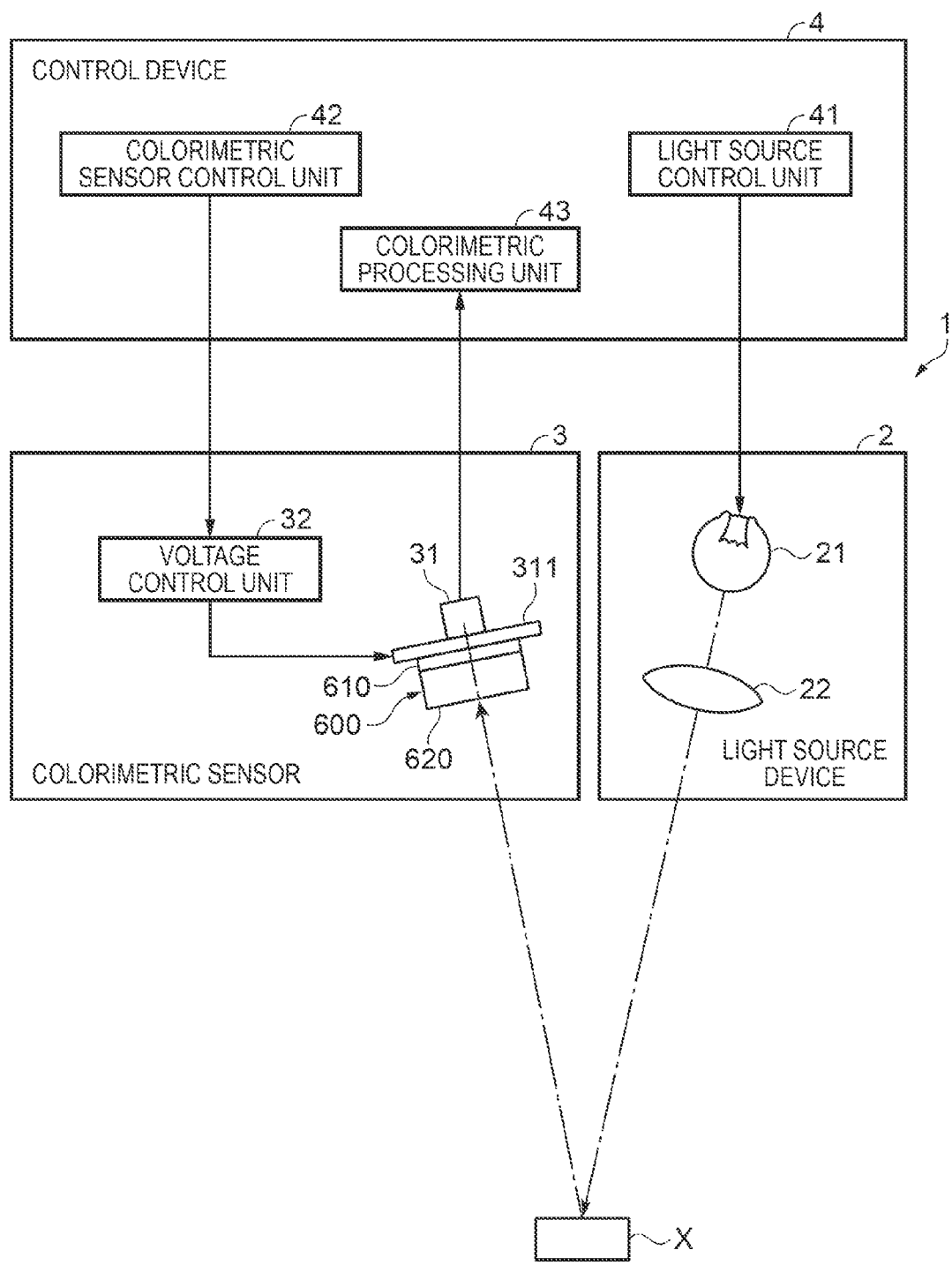
FIG. 6 is a block diagram showing a schematic configuration of a colorimetry apparatus as an electronic apparatus.

FIG. 6 is a block diagram showing a schematic configuration of a colorimetry apparatus.

A colorimetry apparatus 1 as the electronic apparatus includes a light source device 2 which emits light to an investigation target X, a colorimetric sensor 3, and a control device 4 which controls entire operations of the colorimetry apparatus 1. The colorimetry apparatus 1 is an apparatus which causes light incident from the light source device 2 to be reflected on the investigation target X, receives reflected investigation target light by the colorimetric sensor 3, and analyzes and measures chromaticity of the investigation target light, that is, a color of the investigation target X, based on a detection signal output from the colorimetric sensor 3.

Configuration of Light Source Device

The light source device 2 includes a light source 21 and a plurality of lenses 22 (only one described in FIG. 6), and emits white light with respect to the investigation target X. A collimater lens may be included in the plurality of lenses 22, and in this case, the light source device 2 sets the white light emitted from the light source 21 as parallel light by the collimater lens, and emits the light towards the investigation target X from a projector lens (not shown). In the embodiment, the colorimetry apparatus 1 including the light source device 2 is used as an example, however, a configuration of not including the light source device 2 may be used, in a case where the investigation target X is a light emitting member such as a liquid crystal panel, for example.

Configuration of Colorimetric Sensor

The colorimetric sensor 3 configures the optical module of the embodiment and includes the optical filter device 600 (605) of the embodiment. As shown in FIG. 6, the colorimetric sensor 3 includes the optical filter device 600, a detection unit 31 which receives light transmitted through the interference filter 5 of the optical filter device 600, and a voltage control unit 32 which changes a wavelength of light transmitted by the interference filter 5.

The colorimetric sensor 3 includes an incident optical lens (not shown) which guides reflection light (investigation target light) reflected by the investigation target X to the inside, in a position opposing the interference filter 5. The colorimetric sensor 3 disperses light having a predetermined wavelength among the investigation target light emitted from the incident optical lens, by the interference filter 5 in the optical filter device 600, and receives the dispersed light by the detection unit 31.

The detection unit 31 is configured with a plurality of photoelectric conversion elements, and generates an electrical signal according to the received light intensity. Herein, the detection unit 31 is connected to the control device 4 through a circuit board 311, for example, and outputs the generated electrical signal as light receiving signal to the control device 4.

In addition, a terminal portion (not shown) which is formed on the outer side surface of the base substrate 610 is connected to the circuit board 311, and is connected to the voltage control unit 32 through a circuit formed in the circuit board 311.

In such a configuration, the optical filter device 600 and the detection unit 31 are integrally configured through the circuit board 311, and the configuration of the colorimetric sensor 3 can be simplified.

The voltage control unit 32 is connected to an outer terminal portion 616 of the optical filter device 600 through the circuit board 311. The voltage control unit 32 drives the electrostatic actuator 56 by applying a predetermined step voltage between a fixed electrode pad 563P and a movable electrode pad 564P, based on a control signal input from the control device 4. Accordingly, an electrostatic attractive force is generated on the inter-electrode gap G2, and the holding portion 522 is bent, and accordingly the movable portion 521 is displaced to the fixed substrate 51 side and the inter-reflection film gap G1 can be set to a desirable dimension.

Configuration of Control Device

The control device 4 controls the entire operations of the colorimetry apparatus 1.

As the control device 4, for example, in addition to a general-purpose personal computer or a portable information terminal, a dedicated computer for colorimetry can be used.

As shown in FIG. 6, the control device 4 includes a light source control unit 41, a colorimetric sensor control unit 42, and a colorimetric processing unit 43.

The light source control unit 41 is connected to the light source device 2. The light source control unit 41 outputs a predetermined control signal to the light source device 2, based on setting input of an operator, for example, and emits white light having predetermined brightness from the light source device 2.

The colorimetric sensor control unit 42 is connected to the colorimetric sensor 3. The colorimetric sensor control unit 42 sets a wavelength of light received by the colorimetric sensor 3, based on the setting input of an operator, for example, and outputs a control signal for indicating detection of received light intensity of the light having the wavelength to the colorimetric sensor 3. Accordingly, the voltage control unit 32 of the colorimetric sensor 3 sets an applying voltage to the electrostatic actuator 56, based on the control signal, so as to transmit only the wavelength of the light which is desired by an operator.

The colorimetric processing unit 43 analyzes chromaticity of the investigation target X from the received light intensity detected by the detection unit 31.

Operating Effect of Embodiment

The colorimetry apparatus 1 of the embodiment includes the optical filter device 600 of the embodiment. As described above, according to the optical filter device 600, although the movable substrate 52 and the base substrate 610 are fixed to each other using the fixing member 64 which is disposed on one portion, the stress or the like due to a difference in coefficients of thermal expansion is hardly operated to the movable substrate 52 or the fixed substrate 51. Accordingly, it is possible to suppress warping of the fixed reflection film 54 of the fixed substrate 51 or the movable reflection film 55 of the movable substrate 52. Therefore, it is possible to prevent the change of the optical properties of the interference filter 5 which occurs due to the warping of the reflection films 54 and 55. In addition, since the optical filter device 600 has high airtightness of the inner space and has no invasion of a foreign material such as a water particle, it is also possible to prevent the change of the optical properties of the interference filter 5 which occurs due to the foreign material. Accordingly, also in the colorimetric sensor 3, it is possible to detect the light having a target wavelength extracted with high resolution by the detection unit 31, and it is possible to detect proper light intensity with respect to the light having a desirable target wavelength. Therefore, the colorimetry apparatus 1 can perform proper color analysis of the investigation target X.

In addition, the detection unit 31 is provided to oppose the base substrate 610, and the detection unit 31 and a terminal portion which is provided on a base outer surface of the base substrate 610 are connected to one circuit board 311. That is, since the base substrate 610 of the optical filter device 600 is disposed on the light emitting side, the base substrate can be disposed adjacent to the detection unit 31 which detects light emitted from the optical filter device 600. Accordingly, as described above, by wiring one circuit board 311, the wiring structure can be simplified and the number of substrates can be reduced.

In addition, the voltage control unit 32 may be disposed on the circuit board 311, and in this case, the configuration can be further simplified.

The embodiments are not limited to the embodiments described above, and modification, improvement, and the like within a range of achieving the object of the embodiments are included in the embodiments.

For example, in Embodiment 1, the optical filter device 600 in which the inner space is maintained in a vacuum state, is manufactured by joining the base substrate 610 and the lid 620 in the vacuum state, however, it is not limited thereto. For example, a hole portion which communicates the inner space and the outer portion is formed on the lid or the base substrate. After joining the lid and the base substrate in atmosphere air pressure, the air is extracted from the inner space to be in a vacuum state, and the hole portion can be sealed by a sealing member. A metallic sphere is used for the sealing member, for example. In the sealing by the metallic sphere, after fitting the metallic sphere in the hole portion, it is preferred that the metallic sphere is welded in an inner wall of the hole portion by heating the hole portion.

In addition, the interference filter 5 which is accommodated in the optical filter device 600 is not limited to the examples shown in the embodiment. In the embodiment, by applying the voltage to the fixed electrode 561 and the movable electrode 562, the interference filter 5 can change the size of the inter-reflection film gap G1 by the electrostatic attractive force. Other than this type, a configuration of using a dielectric actuator in which a first dielectric coil is disposed as a gap change unit which changes the inter-reflection film gap G1, instead of the fixed electrode 561, and a second dielectric coil or permanent magnet is disposed instead of the movable electrode 562, may be used.

Further, a piezoelectric actuator may be used, instead of the electrostatic actuator 56. In this case, a lower electrode layer, a piezoelectric film, and an upper electrode layer are laminated to each other and disposed on the holding portion 522, for example, a voltage applied between the lower electrode layer and the upper electrode layer is variable as an input value, and accordingly a voltage film can be expanded and contracted to bend the holding portion 522.

In addition, the interference filter 5 is used as an example of the interference filter which is accommodated in the inner space, for example, however an interference filter having a fixed size of the gap G1 may be used. In this case, it is not necessary to form the holding portion 522 for bending the movable portion 521 or the electrode disposition groove 511 for providing the fixed electrode 561 by etching, and the configuration of the interference filter can be simplified. Since the size of the gap G1 is fixed, there is no problem of responsiveness, it is not necessary to maintain the inner space in a vacuum state, and the simplification of the configuration and the improvement of manufacturability can be realized. However, also in this case, when using the optical filter device 600 in a place where the temperature change is great, for example, there is a concern that the glass substrate 630 on the base side and the glass substrate 640 on the lid side receive the stress and are bent, due to expansion of the air in the inner space, or the like. Accordingly, in a case of using such an interference filter, it is also preferable to maintain the inner space in a vacuum state or a reduced pressure state.

The configuration in which the lid 620 includes the lid joining portion 624, the side wall portion 625, and the top surface portion 626, and the top surface portion 626 is parallel with respect to the base substrate 610 is shown, however, it is not limited thereto. As a shape of the lid 620, any shapes may be used, as long as the inner space which can accommodate the interference filter 5 can be formed between the lid and the base substrate 610, and the top surface portion 626 may be formed in a curved surface shape, for example. However, in this case, the manufacturing thereof is considered complicated. That is because, for example, for maintaining airtightness of the inner space, it is necessary to form the glass substrate 640 on the lid side which is joined with the lid 620, in a curved surface shape according to the lid 620, and to form only the portion for blocking the opening portion 621 in a flat surface shape, so that refraction or the like does not occur. Accordingly, it is preferred to use the lid 620 in which the top surface portion 626 is parallel with the base substrate 610 as in Embodiment 1.

In the embodiments, the example in which the glass substrate 630 on the base side and the glass substrate 640 on the lid side are joined with the front and rear surfaces of the housing 601, is shown, however it is not limited thereto. For example, a configuration in which they are joined with the inner space side of the housing 601, may be used.

As the interference filter, in a case of accommodating a reflection filter which reflects light which is subjected to multiple interference by the first reflection film and the second reflection film in the inner space, a configuration of not providing the opening portion 611 and the glass substrate 630 on the base side may be used.

In this case, by providing a beam splitter or the like, for example, to oppose the opening portion 621 of the optical filter device 600, a configuration of separating light entering the optical filter device 600 and light existing from the optical filter device 600, is used, and accordingly, it is possible to detect the separated existing light using the detection unit.

The colorimetry apparatus 1 is used as an example of the electronic apparatus of the embodiment, however, in addition, the optical filter device of the embodiment can be used in various fields.

For example, it can be used as a system of light base for detecting existence of a specified material. As such a system, for example, a car gas leakage detector which performs high sensitive detection of specified gas using a spectroscopic measurement method performed by using the interference filter 5 included in the optical filter device of the embodiment, or a gas detection apparatus such as a photoacoustic rare gas detector for a breath test can be used as an example.

One example of such a gas detection apparatus will be described with reference to the following drawings.

Electronic Apparatus 2

Figure 7:
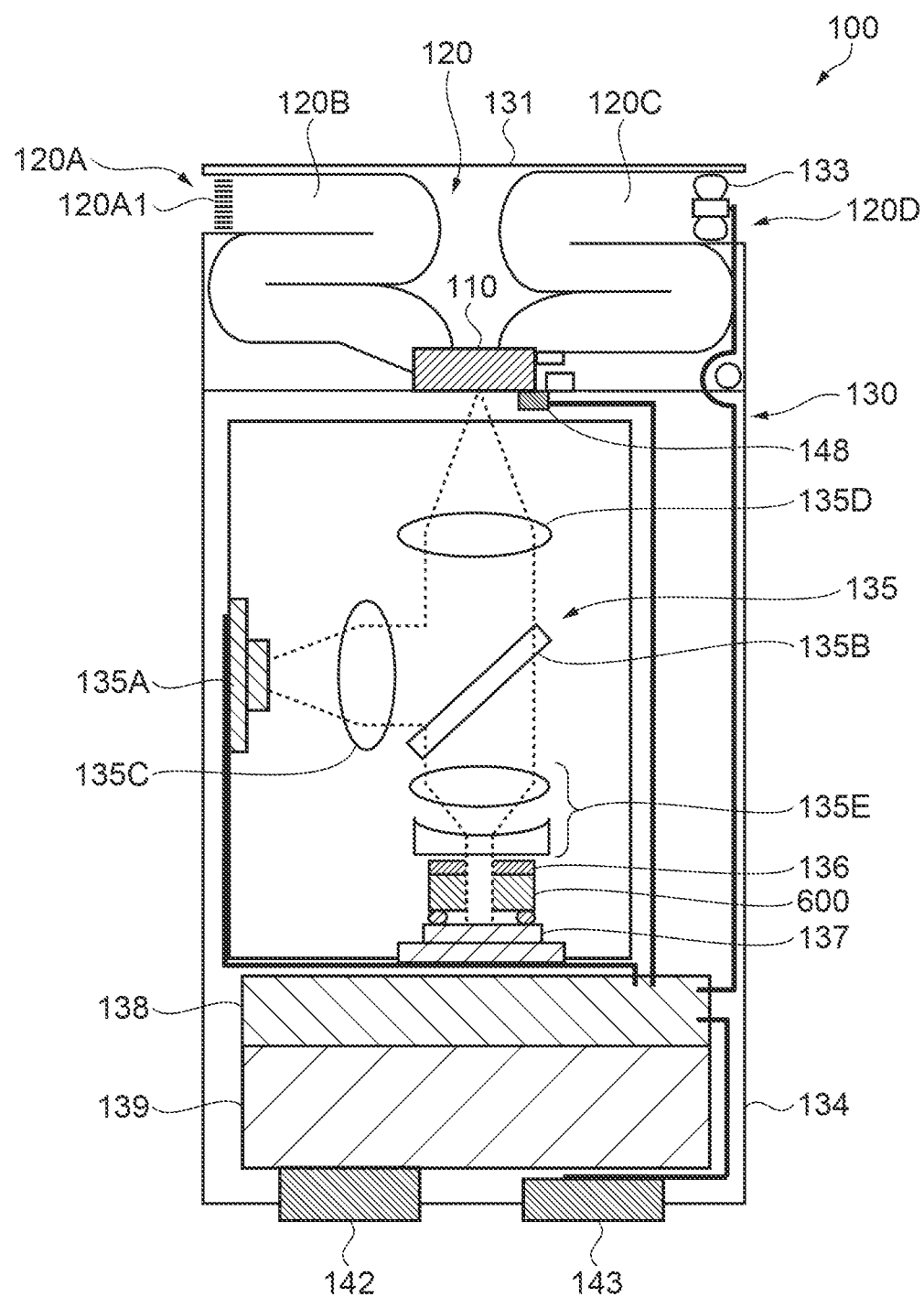
FIG. 7 is a schematic configuration diagram showing a gas detection apparatus as an electronic apparatus.

FIG. 7 is a schematic view showing one example of the gas detection apparatus including the interference filter.

Figure 8:
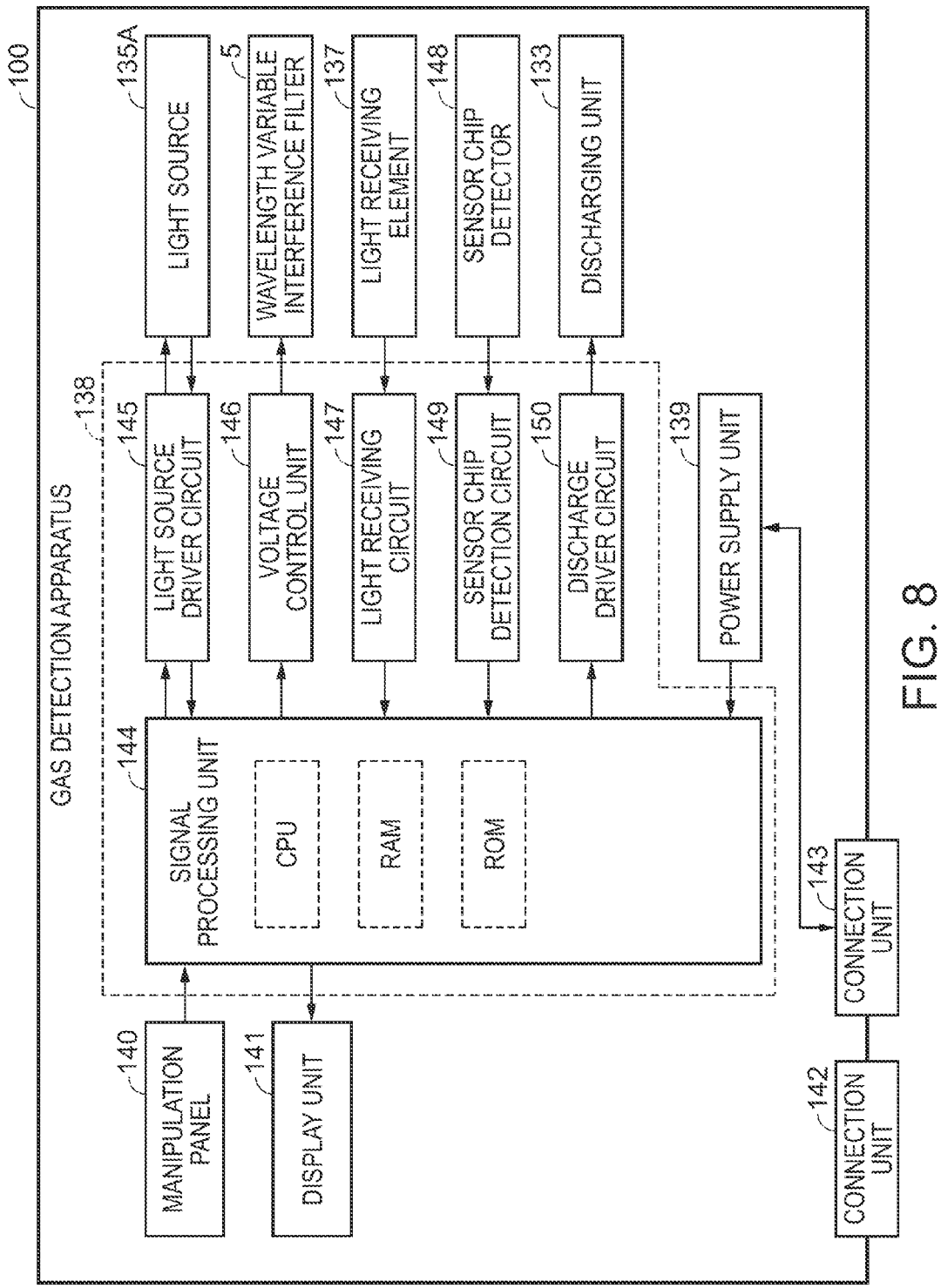
FIG. 8 is a block diagram showing a configuration of a control system of a gas detection apparatus.

FIG. 8 is a block diagram showing a configuration of a control system of the gas detection apparatus of FIG. 7.

A gas detection apparatus 100 as an electronic apparatus includes a sensor chip 110, a flow path 120 which includes a suction port 120A, a suction flow path 120B, a discharging flow path 120C, and a discharging port 120D, and a main body portion 130.

The main body portion 130 is configured with a detection device which includes a sensor portion cover 131 including an opening for attaching or detaching the flow path 120, a discharging unit 133, a housing 134, an optical unit 135, a filter, 136, the optical filter device 600 (605), and alight receiving element 137 (detection unit), a control unit 138 which processes a detected signal and controls the detection unit, and a power supply unit 139 which supplies power. The optical unit 135 is configured with a light source 135A which emits light, a beam splitter 135B which reflects light emitted from the light source 135A to the sensor chip 110 side and transmits the light emitted from the sensor chip side to the light receiving element 137 side, and lenses 135C, 135D, and 135E.

In addition, as shown in FIG. 8, a manipulation panel 140, a display unit 141, a connection unit 142 for an interface with the outside, and the power supply unit 139 are provided on the surface of the gas detection apparatus 100. A connection unit 143 for charging may be included, in a case where the power supply unit 139 is a secondary battery.

Further, as shown in FIG. 8, the control unit 138 of the gas detection apparatus 100 includes a signal processing unit 144 which is configured with a CPU or the like, a light source driver circuit 145 for controlling the light source 135A, a voltage control unit 146 for controlling the interference filter 5 of the optical filter device 600, a light receiving circuit 147 which receives a signal from the light receiving element 137, a sensor chip detection circuit 149 which reads a code of the sensor chip 110 and receives a signal from a sensor chip detector 148 which detects existence or non-existence of the sensor chip 110, and a discharging driver circuit 150 which controls the discharging unit 133.

Next, the operation of the aforementioned gas detection apparatus 100 will be described hereinafter.

The sensor chip detector 148 is provided in the sensor portion cover 131 on the upper portion of the main body portion 130, and the existence or non-existence of the sensor chip 110 is detected by the sensor chip detector 148. If a detection signal from the sensor chip detector 148 is detected, the signal processing unit 144 determines that the sensor chip 110 is in a state of being mounted, and outputs a display signal for displaying a command for performing a detection operation to the display unit 141.

For example, if the manipulation panel 140 is manipulated by an operator, and an indication signal for starting a detection process is output from the manipulation panel 140 to the signal processing unit 144, first, the signal processing unit 144 outputs a signal of light source operation to the light source driver circuit 145 to operate the light source 135A. If the light source 135A is driven, the stable laser light of linearly polarized light is emitted from the light source 135A with a single wavelength. In addition, a temperature sensor or a light intensity sensor is mounted in the light source 135A, and the information thereof is output to the signal processing unit 144. If it is determined that the light source 135A is stably operated, based on a temperature or light intensity input from the light source 135A, the signal processing unit 144 controls the discharging driver circuit 150 to operate the discharging unit 133. Accordingly, a gas sample including a target material to be detected (gas molecule) is induced from the suction port 120A to the suction flow path 120B, inside of the sensor chip 110, the discharging flow path 120C, and the discharging port 120D. A dust filter 120A1 is provided on the suction port 120A, and relatively large dust or a part of vapor is removed.

In addition, the sensor chip 110 is a sensor in which a plurality of metallic nanostructures are embedded and localized surface plasmon resonance is used. In such a sensor chip 110, an enhanced electric field is formed between metallic nanostructures by laser light, and if a gas molecule is put into this enhanced electric field, Raman scattering light including information of molecule vibrating and Rayleigh scattering light are generated.

The Raman scattering light or the Rayleigh scattering light is incident to the filter 136 through the optical unit 135, the Rayleigh scattering light is separated by the filter 136, and the Raman scattering light is incident to the optical filter device 600. The signal processing unit 144 controls the voltage control unit 146, adjusts the voltage applied to the interference filter 5 of the optical filter device 600, and disperses the Raman scattering light corresponding to the gas molecule which is the detection target by the interference filter 5 of the optical filter device 600. After that, if the dispersed light is received by the light receiving element 137, a light receiving signal according to the received light intensity is output to the signal processing unit 144 through the light receiving circuit 147.

The signal processing unit 144 compares spectrum data of the Raman scattering light corresponding to the gas molecule which is the detection target obtained as described above and data stored in a ROM, determines whether or not it is the gas molecule of the target, and performs specification of material. In addition, the signal processing unit 144 displays the result information to the display unit 141 or outputs the result information to the outside from the connection unit 142.

In FIGS. 7 and 8, the gas detection apparatus 100 which disperses the Raman scattering light by the interference filter 5 of the optical filter device 600 to perform gas detection from the dispersed Raman scattering light is used as an example. In addition, as the gas detection apparatus, a gas detection apparatus which specifies gas types by detecting unique absorbency of the gas may be used. In this case, a gas sensor which makes the gas flow into the sensor and detects light absorbed by the gas among the incident light is used as the optical module of the embodiment. A gas detection apparatus which analyzes and determines the gas flowing into the sensor by the gas sensor is used as the electronic apparatus of the embodiment. Even with this configuration, it is possible to detect the component of the gas using the interference filter 5.

In addition, as a system for detecting the existence of the specified material, not limited to the detection of the gas, a material component analysis apparatus such as a noninvasive measurement apparatus of sugar by near-infrared spectrometry, or a noninvasive measurement apparatus of information such as food, a living body, or mineral can be used as an example.

Hereinafter, a food analysis apparatus will be described as one example of the material component analysis apparatus.

Electronic Apparatus 3

Figure 9:
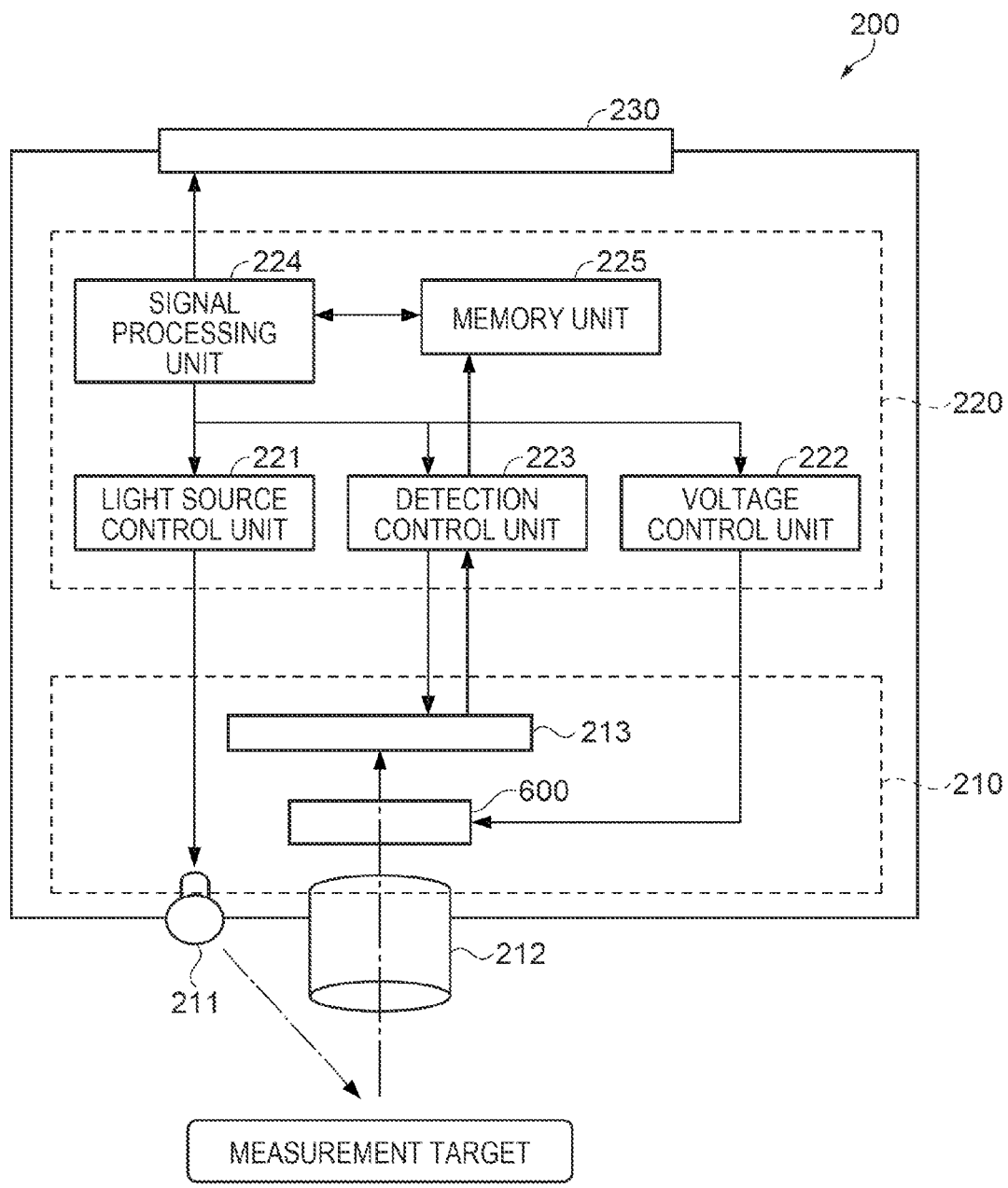
FIG. 9 is a schematic configuration diagram of a food analysis apparatus as an electronic apparatus.

FIG. 9 is a diagram showing a schematic configuration of a food analysis apparatus.

A food analysis apparatus 200 as the electronic apparatus includes a detector 210 (optical module), a control unit 220, and a display unit 230. The detector 210 includes a light source 211 which emits light, an imaging lens 212 which introduces light from a measurement subject, the optical filter device 600 which disperses light introduced from the imaging lens 212, and an imaging unit 213 (detection unit) which detects the dispersed light.

In addition, the control unit 220 includes a light source control unit 221 which performs lighting-on and lighting-off control of the light source 211 and brightness control at the time of turning on the light, a voltage control unit 222 which controls the interference filter 5 of the optical filter device 600 (605), a detection control unit 223 which controls the imaging unit 213 and acquires a spectral image imaged by the imaging unit 213, a signal processing unit 224, and a memory unit 225.

In the food analysis apparatus 200, if the system is operated, the light source 211 is controlled by the light source control unit 221 and the light is emitted to the measurement subject from the light source 211. The light reflected by the measurement subject is incident to the optical filter device 600 through the imaging lens 212. Voltage which can disperse the predetermined wavelength is applied to the interference filter 5 of the optical filter device 600 by the control of the voltage control unit 222, and the dispersed light is imaged by the imaging unit 213 configured with a CCD camera or the like, for example. The imaged light is stored in the memory unit 225 as a spectral image. The signal processing unit 224 controls the voltage control unit 222 to change a voltage value applied to the interference filter 5, and acquires the spectral image with respect to each wavelength.

The signal processing unit 224 performs arithmetic processing of data of each pixel of each image stored in the memory unit 225, and acquires a spectrum of each pixel. In addition, information related to the component of the food with respect to the spectrum is stored in the memory unit 225, for example, and the signal processing unit 224 analyzes the data of the acquired spectrum, based on the information related to the food stored in the memory unit 225, and acquires food component included in the detection target and the content thereof. It is possible to calculate food calorie or freshness, from the acquired food components and the content thereof. In addition, by analyzing the spectrum distribution in the image, it is possible to perform extraction of the portion in which the freshness in the food of the investigation target is decreased, and it is also possible to perform detection of a foreign material included in the food.

The signal processing unit 224 performs a process of displaying information of the components or the content, the calorie, or the freshness of the food of the investigation target obtained by doing as described above, to the display unit 230.

In FIG. 9, the food analysis apparatus 200 is used as an example, however with the substantially same configuration, a noninvasive measurement apparatus of the other information described above can also be used. For example, a living body analysis apparatus which analyzes a living body component such as measurement or analysis of a body liquid component such as blood can be used. As such a living body analysis apparatus, if an apparatus which detects ethyl alcohol is used which measures a body liquid component such as blood, for example, an intoxicated driving prevention device which detects alcohol concentration of a driver can be used. In addition, an electronic endoscope system including such a living body analysis apparatus can also be used.

A mineral analysis apparatus which performs component analysis of mineral can be used.

The electronic apparatus can be applied to the following apparatus.

For example, by temporally changing intensity of the light of each wavelength, it is possible to transmit the data by the light of each wavelength, and in this case, by dispersing the light of the specified wavelength by the interference filter provided on the optical module and receiving by the light receiving unit, it is possible to extract the data transmitted by the light of the specified wavelength, and by processing the data of the light of each wavelength by the electronic apparatus including the optical module for data extraction, it is possible to perform optical communication.

The electronic apparatus can also be applied to a spectroscopic camera which images a spectral image, or a spectrometer. As one example of the spectroscopic camera, an infrared camera in which the interference filter is mounted is used.

Electronic Apparatus 4

Figure 10:
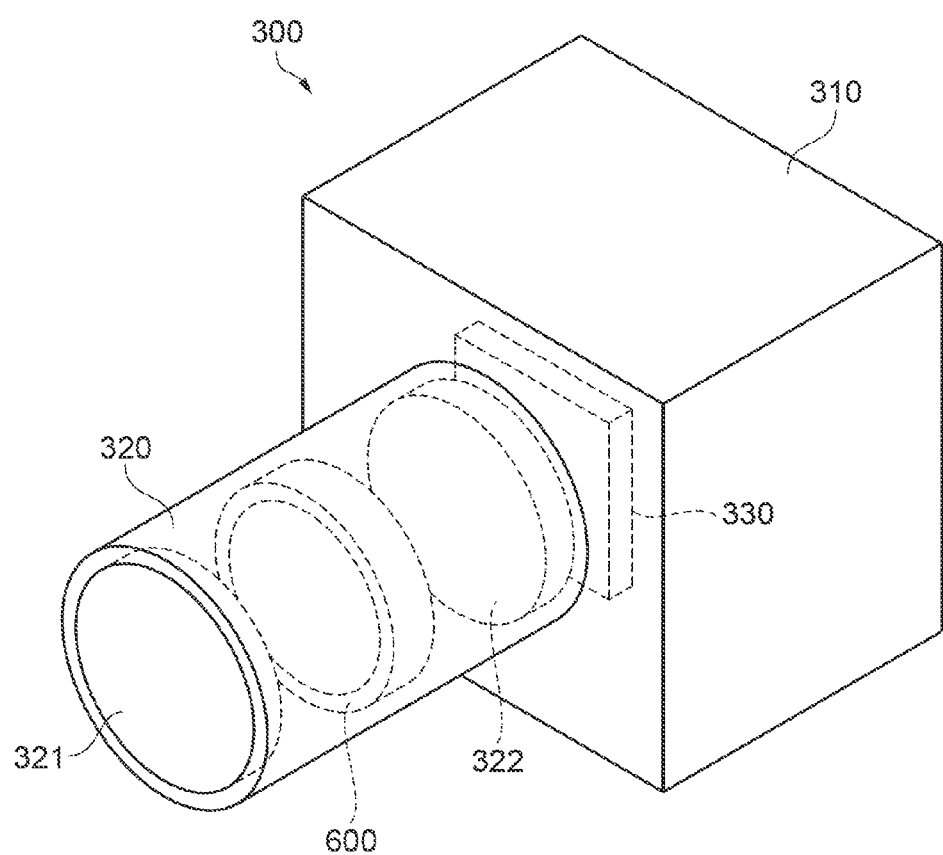
FIG. 10 is a schematic configuration diagram of a spectroscopic camera as an electronic apparatus.

FIG. 10 is a schematic view showing a schematic configuration of the spectroscopic camera.

A spectroscopic camera 300 as the electronic apparatus includes a camera main body 310, an imaging lens unit 320, and an imaging unit 330 (detection unit).

The camera main body 310 is a portion which is grasped or manipulated by a user.

The imaging lens unit 320 is provided on the camera main body 310 and introduces an incident image light to the imaging unit 330. In addition, as shown in FIG. 10, the imaging lens unit 320 includes an objective lens 321, an imaging lens 322, and the optical filter device 600 (605) provided between the lenses.

The imaging unit 330 is configured with a light receiving element, and images the image light introduced by the imaging lens unit 320.

In such a spectroscopic camera 300, by transmitting the light of the wavelength which is an imaging target by the interference filter 5 of the optical filter device 600, it is possible to image the spectral image of the light having a predetermined wavelength.

In addition, the interference filter included in the optical filter device may be used as a band pass filter, and for example, can be used as an optical laser apparatus which disperses and transmits only light in a narrow band around the predetermined wavelength by the interference filter 5, among the light of the predetermined wavelength band with the injection from the light emitting element, for example.

In addition, the interference filter included in the optical filter device may be used as a biometric authentication apparatus, or can also be applied to an authentication apparatus of a blood vessel, fingerprint, retina, iris, or the like, using the light in a near-infrared region or a visible region.

Further, the optical module and the electronic apparatus can be used as a concentration detection apparatus. In this case, infrared energy (infrared light) emitted from the material is dispersed and analyzed by the interference filter 5 to measure subject concentration in the sample.

As described above, the optical filter device can also be applied to any apparatus which disperses predetermined light from incident light. As described above, since the optical filter device can disperse the plurality of wavelengths by one device, it is possible to precisely perform measurement of the spectrum of the plurality of wavelengths and detection with respect to the plurality of components. Accordingly, compared to the apparatus of the related art which extracts the predetermined wavelength by the plurality of devices, it is possible to promote miniaturization of the optical module or the electronic apparatus, and for example, a portable or car optical device can be preferably used.

In the descriptions of the colorimetry apparatus 1, the gas detection apparatus 100, the food analysis apparatus 200, and the spectroscopic camera 300 described above, the example in which the optical filter device 600 (605) of the embodiment is applied is shown, however it is not limited thereto. Of course, an optical filter device according to modification examples can be applied to the colorimetry apparatus 1 or the like, in the same manner.

The embodiments are not limited to the embodiments described above, various modification, improvement, and the like can be added to the embodiments described above. Hereinafter, the modification examples will be described. The same configuration components as embodiments described above are denoted with the same reference numerals and the overlapped descriptions are omitted.

MODIFICATION EXAMPLE 1

Figure 11:
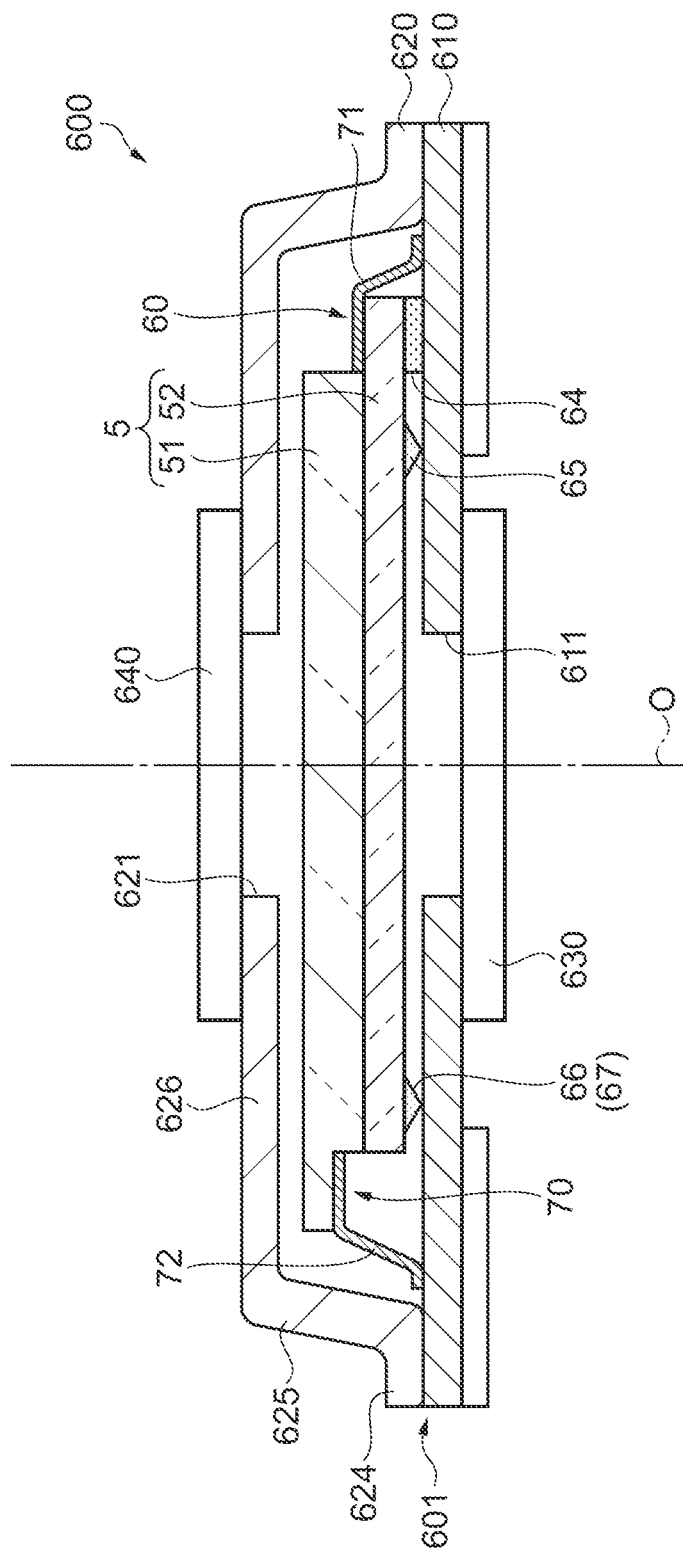
FIG. 11 is a side cross-sectional view of an optical filter device according to Modification Example 1.

FIG. 11 is a side cross-sectional view of an optical filter device according to Modification Example 1 and corresponds to FIG. 2.

In the embodiments described above, it is described that the electric connection between the interference filter 5 and the base substrate 610 is performed by the bonding wire, however, it is not limited to this configuration, and any configurations may be used as long as it is a connecting method which can realize electric connection. For example, connection using flexible printed circuits (FPC) may be used. In detail, as shown in FIG. 11, the extended region 60 and the terminal of the base substrate 610 may be connected to each other by a FPC 71. In FIG. 11, as a preferred example, an extended region 70 is also formed on the opposing side of the extended region 60. Specifically, the extended region 70 is formed by protrusion of one side of the fixed substrate 51 from the movable substrate 52. In the same manner as the extended region 60 side, the extended region 70 and the terminal of the base substrate 610 are electrically connected to each other by an FPC 72.

As described above, by using the FPC, instead of the bonding wire, the interference filter 5 and the base substrate 610 can be electrically connected to each other, and the same operation effects as each embodiment described above can be obtained.

In addition, since the two opposing sides are electrically connected to each other, compared to the case in which the connection terminals are aggregated on one side, the pattern wiring to the connection terminals in the interference filter 5 is easily performed and it is possible to miniaturize the interference filter 5.

MODIFICATION EXAMPLE 2

Figure 12:
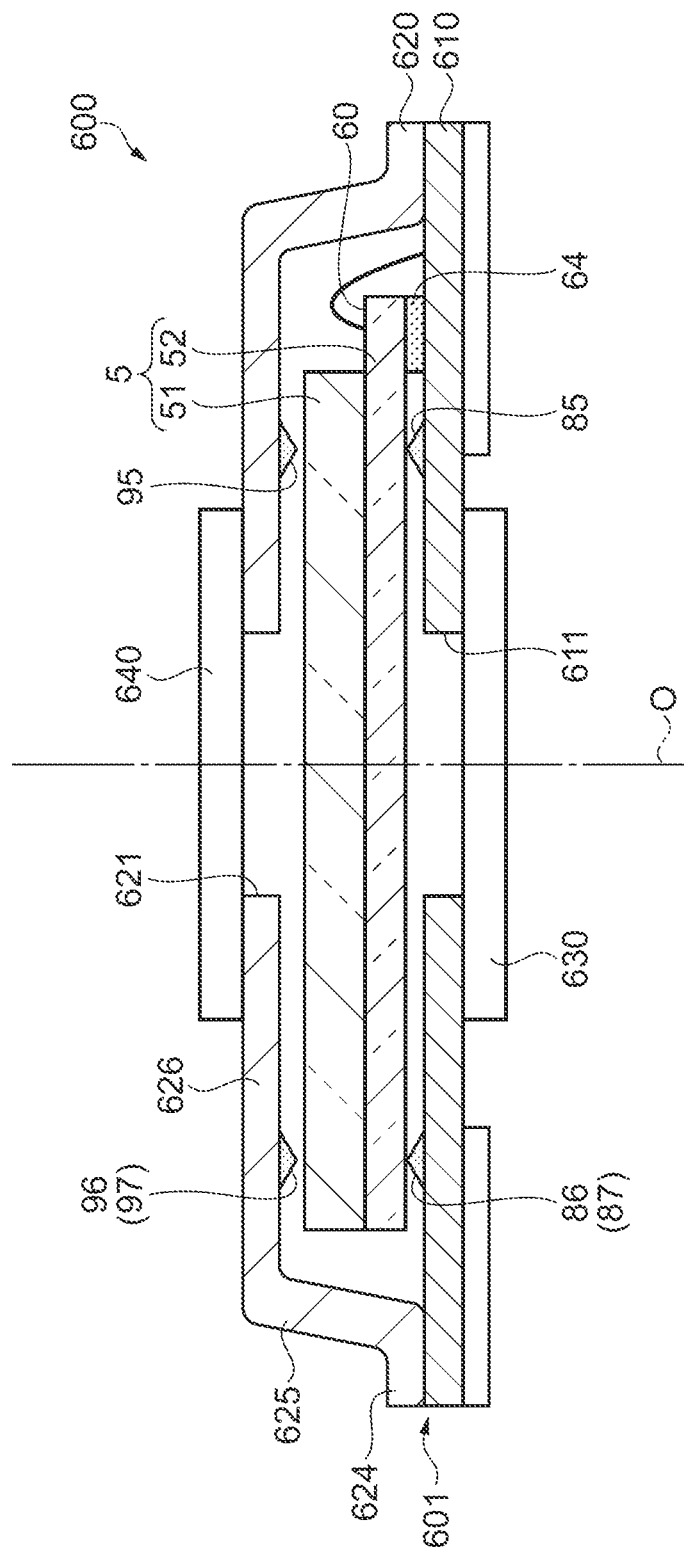
FIG. 12 is a side cross-sectional view of an optical filter device according to Modification Example 2.

FIG. 12 is a side cross-sectional view of an optical filter device according to Modification Example 2 and corresponds to FIG. 2.

In the embodiments described above, it is described that the spacer portion is formed on the interference filter 5, however, it is not limited to this configuration, and the spacer portion (protrusion) may be formed on the housing 601 side. In detail, in this Modification Example, spacer portions 85, 86, and 87 are formed on the surface of the base substrate 610. In addition, spacer portions 95, 96, and 97 are formed on the top surface portion 626 of the lid 620. A planar position of the spacer portions 85, 86, and 87 and the spacer portions 95, 96, and 97 are the same as the spacer portions 65, 66, and 67 of FIG. 3. The cross-sectional shape of each spacer is a conical shape, and the apex thereof faces the interference filter 5 side. In addition, the height (space) of each spacer is same as the embodiments described above.

The spacer portion is not formed on the front and rear surface of the interference filter 5. The interference filter 5 is fixed with respect to the base substrate 610 by the fixing member 64 on one portion.

With this configuration, since each spacer functions as a stopper, the same operation effects as each embodiment described above can be obtained. In detail, even in a case where the impact is applied to the housing 601 and the interference filter 5 is moved in height direction inside the housing, with the fixing member 64 as a supporting point, the spacer portions 95, 96, and 97 of the lid 620 function as stoppers in front surface direction, and the spacer portions 85, 86, and 87 of the base substrate 610 function as stoppers in rear surface direction, respectively.

MODIFICATION EXAMPLE 3

Figure 13:
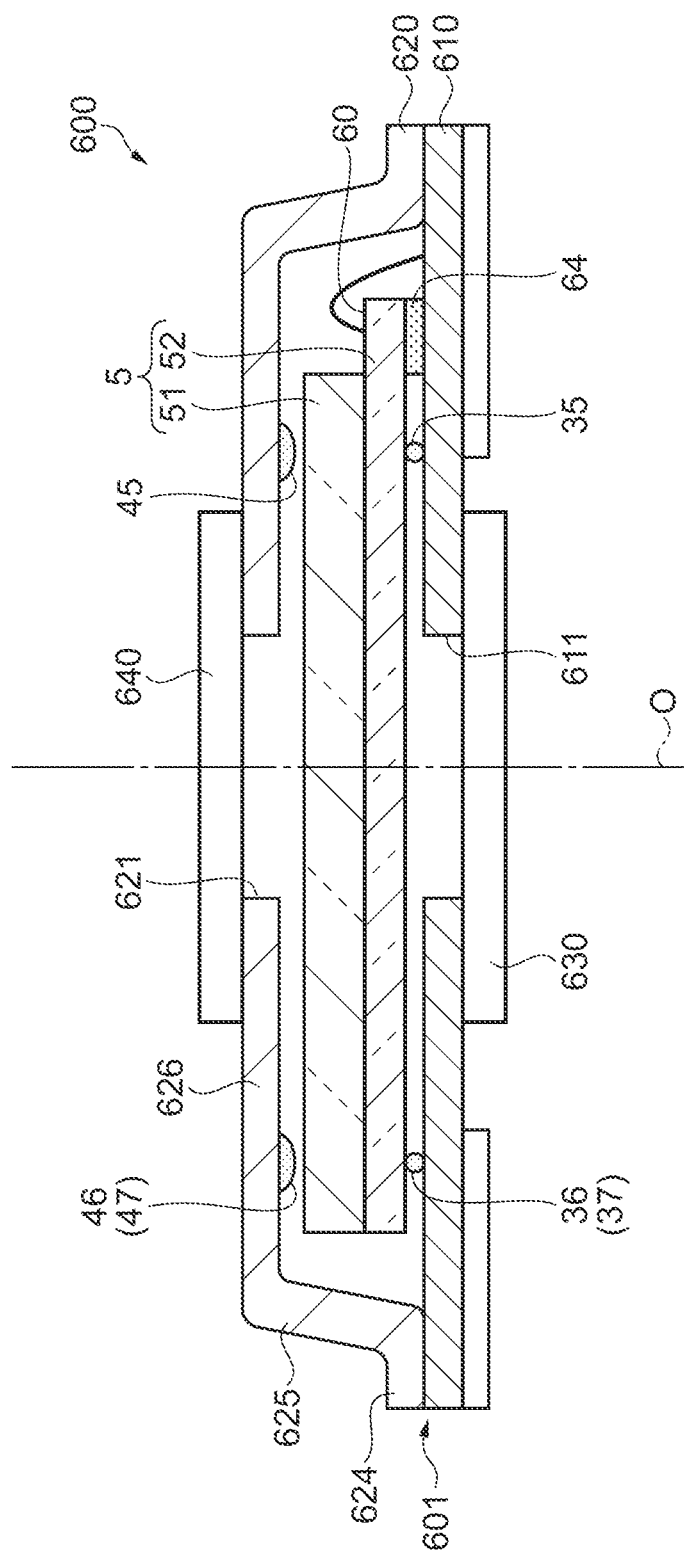
FIG. 13 is side cross-sectional view of an optical filter device according to Modification Example 3.

FIG. 13 is side cross-sectional view of an optical filter device according to Modification Example 3 and corresponds to FIG. 2.

In the embodiments and the modification examples, it is described that the spacer portions are formed on the interference filter 5, or the base substrate 610 and the lid 620 side, however, it is not limited to this configuration, and spacer portions may be disposed alone. In detail, in this modification example, spherical spacer portions 35, 36, and are disposed between the base substrate 610 and the interference filter 5. Dome-shaped spacer portions 45, 46, and 47 which are formed by droplets of the adhesive are disposed on the top surface portion 626 of the lid 620. A planar position of the spacer portions 35, 36, and 37 and the spacer portions 45, 46, and 47 are the same as the spacer portions 65, 66, and 67 of FIG. 3. In addition, the height (space) of each spacer is the same as the embodiments described above. As the preferred example, the dome-shaped spacer portions 45, 46, and 47 are formed with respect to the top surface portion 626 of the lid 620, by discharging a proper amount of an ultraviolet curable adhesive (resin) by an ink jet method and then emitting an ultraviolet ray to cure.

With this configuration, since each spacer functions as a stopper, the same operation effects as each embodiment described above can be obtained.

In addition, the spherical spacer portions may be disposed on both of the front and rear surfaces of the interference filter 5. In the same manner, the dome-shaped spacer portions may be disposed on both of the base substrate 610 and the lid 620 side.

Since the function as a stopper can be obtained even with an organic material, the stopper may be formed using a resin material or an adhesive, as the spacer portion 45.

MODIFICATION EXAMPLE 4

Figure 14A:
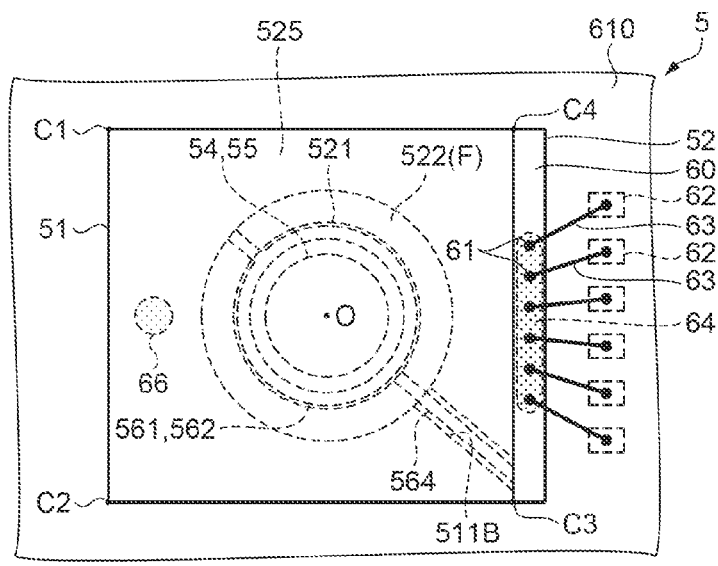
FIGS. 14A to 14C are plan views of an interference filter according to Modification Example 4.
Figure 14B:
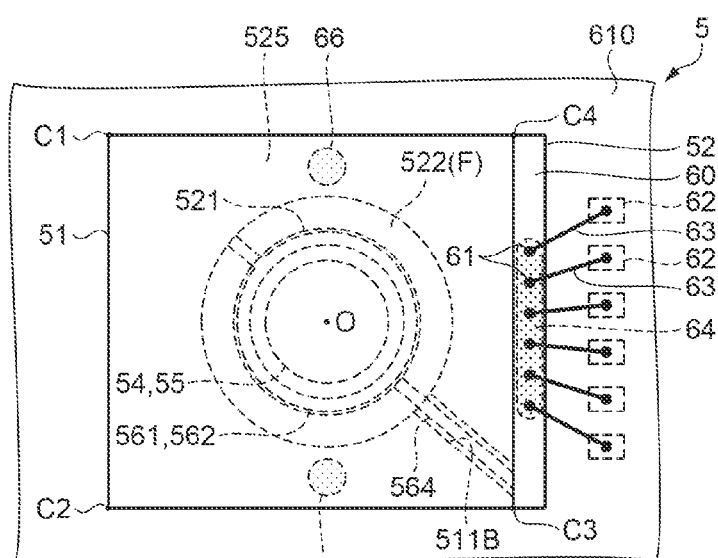
Figure 14C:
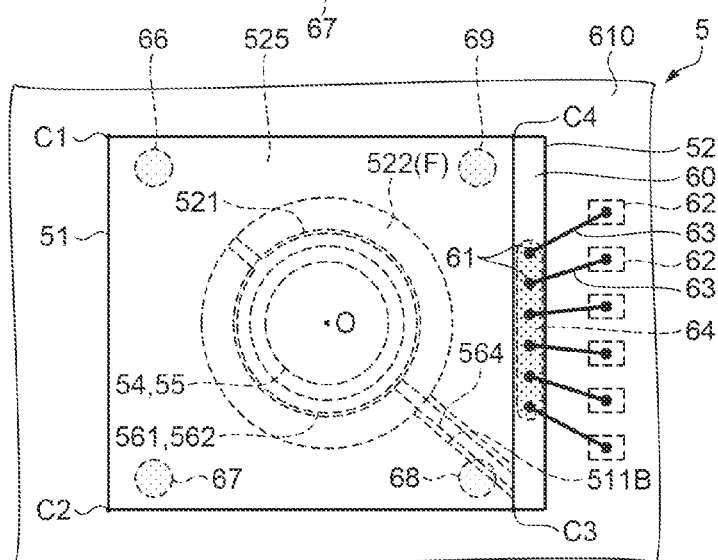

FIGS. 14A to 14C are plan views of an interference filter according to Modification Example 4 and correspond to FIG. 3.

In the embodiments and the modification examples, it is described that the spacer portions are disposed on three portions in a plan view, however, it is not limited to this configuration, and any configuration may be used as long as the spacer portions are formed on one or more portions. In detail, any configuration may be used as long as the spacer portions are formed on one or more portions outside the filter region F and on the portion separated from the fixing member 64.

As shown in FIG. 14A, for example, a configuration in which the spacer portion 66 is formed on one portion substantially in the middle of the opposing side of the fixing member 64 (extended region 60) may be used. The configuration of the spacer portion 66 is the same as the descriptions in Embodiment 1, except for the planar position. As described above, it is preferable to form the spacer portion 66 in a position diagonal with respect to the fixing member 64 with the filter region F interposed therebetween.

In addition, as shown in FIG. 14B, a configuration in which the spacer portions 66 and 67 are disposed substantially in the middle of the two sides adjacent to the fixing member 64 (extended region 60) may be used.

As shown in FIG. 14C, a configuration in which the spacer portions 66, 67, 68, and 69 are disposed in vicinities of four apexes of the rectangular interference filter 5 may be used. The vicinities of the apexes are vicinity regions in which the same effects as the case where the spacer portions are formed on the apexes are obtained. In detail, any regions may be used as long as they are vicinity regions in which the spacer portions function as stoppers for supporting angle portions of the rectangular interference filter 5 when the impact is applied.

With this configuration, since each spacer functions as a stopper, the same operation effects as each embodiment described above can be obtained.

MODIFICATION EXAMPLE 5

Figure 15A:
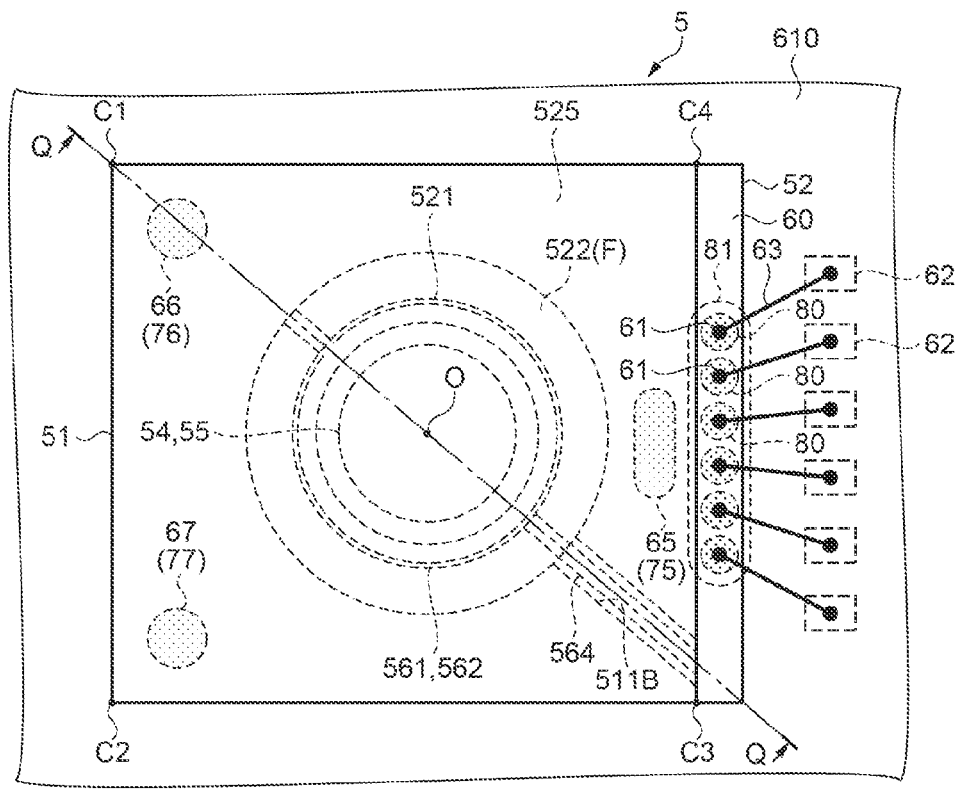
FIGS. 15A and 15B are plan views of an interference filter according to Modification Example 5.
Figure 15B:
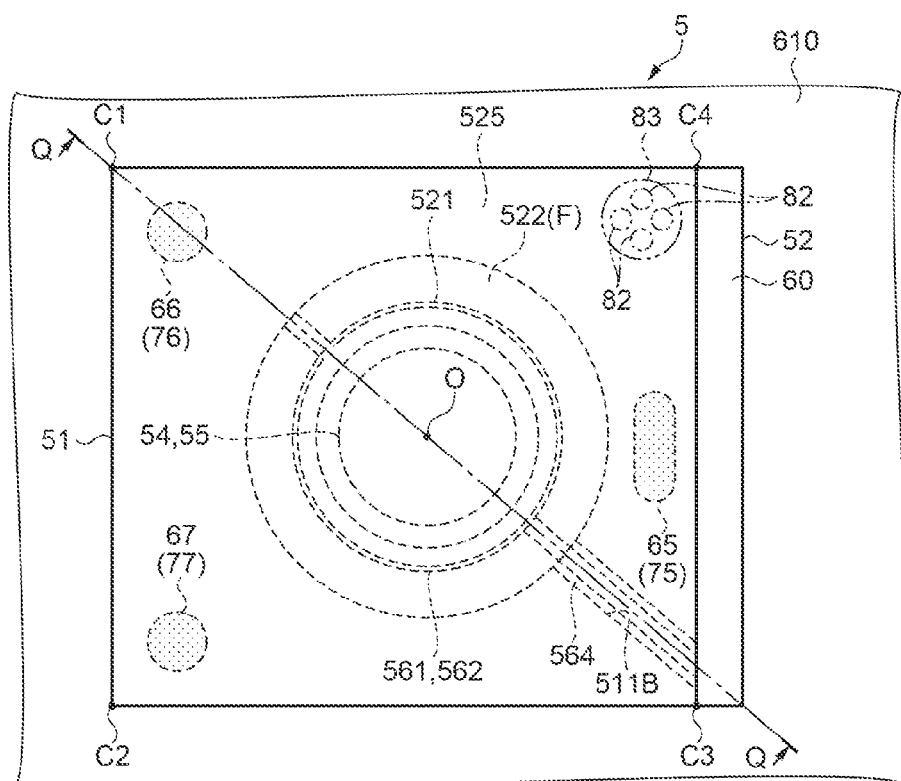

FIGS. 15A and 15B are plan views of an interference filter according to Modification Example 5 and correspond to FIG. 3.

In the embodiments and the modification examples, it is described that the fixing member 64 is an integrated member, in a plan view, which is disposed on one portion, however, it is not limited to this configuration, and any configuration may be used as long as it fixes a one planar region.

For example, as shown in FIG. 15A, six disc-shaped (scallop-shaped) sub fixing portions 80 are formed for each rear surface of the six connection terminals 61 formed on the extended region 60, and a rectangular region obtained by binding the six sub fixing portions 80 may be set to a fixing member 81 on one portion.

As shown in FIG. 15B, four disc-shaped (scallop-shaped) sub fixing portions 82 are formed to be aggregated in a vicinity of an apex of an upper right portion of the rectangular interference filter 5, and a circular region obtained by binding the four sub fixing portions 82 may be set to a fixing member 83 on one portion.

With this configuration, since each of the fixing member 81 and the fixing member 83 exhibits the same function as the fixing member 64 of Embodiment 1, the same operation effects as each embodiment described above can be obtained.

In addition thereto, for the specific structure when performing the invention, modifications can be suitably performed to the other structure in a range of achieving the object of the invention.

The entire disclosure of Japanese Patent Application No. 2012-277756 filed on Dec. 20, 2012 is expressly incorporated by reference herein.

What is claimed is:

1. An optical filter device comprising:
   an interference filter which includes a first substrate, a second substrate which opposes the first substrate, a first reflection film which is provided on the first substrate, and a second reflection film which is provided on the second substrate and opposes the first reflection film with a predetermined gap interposed therebetween; and
   a housing which includes a base substrate for loading the interference filter and accommodates the interference filter,
   wherein the interference filter is fixed with respect to the base substrate by a fixing member which is disposed on one portion of the outside, in a plan view, of a filter region including the first reflection film and the second reflection film,
   spacer portions which are lower than a height of the fixing member are formed outside of the filter region and on portions separated from the fixing member, and
   the spacer portions are protrusions formed on the surface of the second substrate facing the base substrate.

2. The optical filter device according to claim 1,
   wherein the interference filter is formed in a rectangular shape in a plan view,
   one side of the second substrate forms an extended region which is extended from the first substrate, and
   the fixing member is provided between the extended region and the base substrate.

3. The optical filter device according to claim 2,
   wherein the spacer portions are formed between the filter region and the extended region, in a plan view, and/or on two apexes on the opposing side of the side on which the extended region is formed.

4. The optical filter device according to claim 2,
   wherein a first terminal for electric connection is formed on the surface of the extended region facing the first substrate, and
   the first terminal and a second terminal which is formed on the base substrate are connected to each other by wire bonding.

5. The optical filter device according to claim 4,
   wherein a plurality of the first terminals are formed, and
   the fixing member is disposed so as to be superimposed on the plurality of first terminals.

6. The optical filter device according to claim 1,
   wherein the housing further includes a lid having a recessed shape,
   the lid is joined with the base substrate in a state where a recessed shape thereof is put face down, and the spacer portions are also formed between the interference filter and a bottom surface of the recessed shape of the lid.

7. The optical filter device according to claim 6, wherein the spacer portions are protrusions which are formed on the base substrate or the bottom surface of the recessed shape of the lid.

8. The optical filter device according to claim 1, wherein the fixing member is in a region in which a plurality of sub fixing portions are formed to be aggregated.

9. An electronic apparatus comprising the optical filter device according to claim 1.

10. An optical filter device comprising:
an interference filter which includes a first substrate, a second substrate which opposes the first substrate, a first reflection film which is provided on the first substrate, and a second reflection film which is provided on the second substrate and opposes the first reflection film with a predetermined gap interposed therebetween; and
a housing which includes a base substrate for loading the interference filter and accommodates the interference filter,
wherein the interference filter is fixed with respect to the base substrate by a fixing member which is disposed on one portion of the outside, in a plan view, of a filter region including the first reflection film and the second reflection film,
spacer portions which are lower than a height of the fixing member are formed outside the filter region and on portions separated from the fixing member, and
the spacer portions are protrusions formed on the surface of the second substrate facing the base substrate.

11. An optical filter device comprising:
an interference filter which includes a first substrate, a second substrate which opposes the first substrate, a first reflection film which is provided on the first substrate, and a second reflection film which is provided on the second substrate and opposes the first reflection film with a predetermined gap interposed therebetween; and
a housing which includes a base substrate for loading the interference filter and accommodates the interference filter, and includes a lid having a recessed shape, the lid being joined with the base substrate in a state where the recessed shape thereof is put face down,
wherein the interference filter is fixed with respect to the base substrate by a fixing member which is disposed on one portion of the outside, in a plan view, of a filter region including the first reflection film and the second reflection film,
spacer portions which are lower than a height of the fixing member are formed outside the filter region and on portions separated from the fixing member, and the spacer portions are also formed between the interference filter and a bottom surface of the recessed shape of the lid.

* * * * *